United States Patent
Kawai et al.

(10) Patent No.: US 8,597,120 B2
(45) Date of Patent: Dec. 3, 2013

(54) GAME DEVICE AND STORING MEDIUM THAT STORES GAME PROGRAM

(75) Inventors: Toshinori Kawai, Kyoto (JP); Shigeyuki Asuke, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1778 days.

(21) Appl. No.: 10/842,483

(22) Filed: May 11, 2004

(65) Prior Publication Data

US 2004/0229691 A1  Nov. 18, 2004

(30) Foreign Application Priority Data

May 12, 2003  (JP) ................................ 2003-132522

(51) Int. Cl.
  *A63F 13/06*  (2006.01)
(52) U.S. Cl.
  USPC ................................ 463/34; 463/31; 345/474
(58) Field of Classification Search
  USPC .............. 463/30, 31, 32, 44, 33, 34; 345/419, 345/474
  See application file for complete search history.

(56) References Cited

U.S. PATENT DOCUMENTS

| | | | | |
|---|---|---|---|---|
| 5,566,280 A | * | 10/1996 | Fukui et al. | 345/419 |
| 6,022,274 A | * | 2/2000 | Takeda et al. | 463/44 |
| 6,139,433 A | * | 10/2000 | Miyamoto et al. | 463/32 |
| 6,155,926 A | * | 12/2000 | Miyamoto et al. | 463/32 |
| 6,267,673 B1 | * | 7/2001 | Miyamoto et al. | 463/31 |
| 6,331,146 B1 | * | 12/2001 | Miyamoto et al. | 463/32 |
| 6,454,652 B2 | * | 9/2002 | Miyamoto et al. | 463/31 |
| 6,572,478 B2 | * | 6/2003 | Miyamoto et al. | 463/43 |
| 6,712,703 B2 | * | 3/2004 | Miyamoto et al. | 463/43 |
| 7,001,280 B2 | * | 2/2006 | Kudo | 463/43 |
| 7,137,890 B2 | * | 11/2006 | Ouchi | 463/30 |
| 7,198,568 B2 | * | 4/2007 | Takahashi et al. | 463/1 |
| 2004/0224757 A1 | * | 11/2004 | Yamamura et al. | 463/30 |

OTHER PUBLICATIONS

Nintendo Power, Strategy Guide, Super Mario Bros. 3, vol. SG1/NP13, 1990.*

* cited by examiner

*Primary Examiner* — Damon Pierce
(74) *Attorney, Agent, or Firm* — Nixon & Vanderhye, P.C.

(57) ABSTRACT

A game apparatus includes a CPU, and in this game apparatus, a proceeding direction of a player object in a switched scene is detected when the scene is switched. Regarding the proceeding direction, in a case of a drainpipe, and etc., having an exit in the switched scene with a directionality, its direction of the exit is detected, and in a case of a door, and etc., having the exit without directionality, the proceeding direction of the player object in the scene yet to be switched is detected, for example. Furthermore, a screen display position of a display screen is adjusted in such a manner that a display area on a proceeding direction side in the switched scene is rendered as large as possible, for example. Therefore, the display screen, on which the proceeding direction in the switched scene is reflected, is generated and displayed.

18 Claims, 24 Drawing Sheets

(A)  (B)

(A)  (B)

(A)

(B)

(A)

(B)

(A)

(B)

(A)

(B)

(A)

(B)

(A)

(B)

(A)

(B)

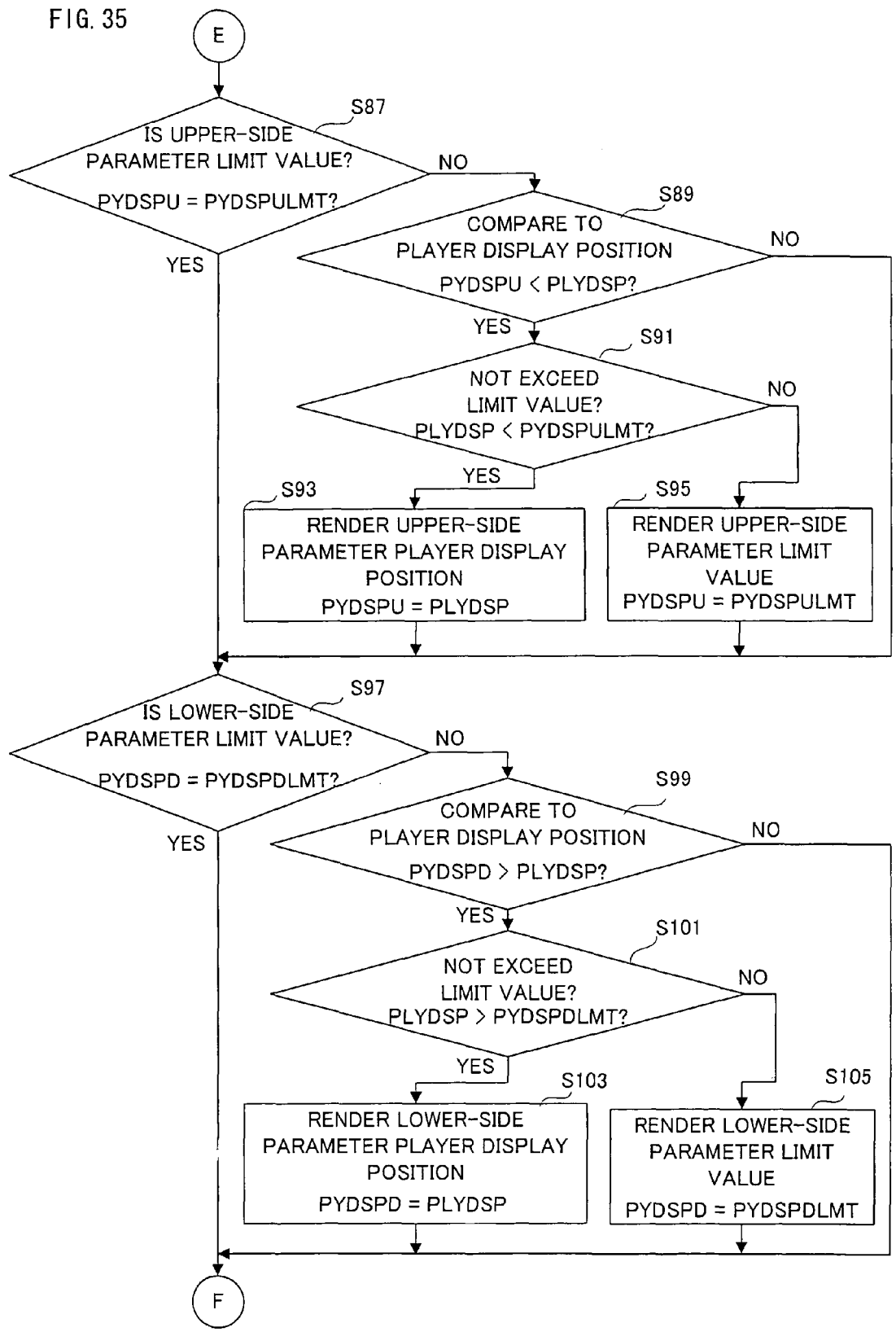

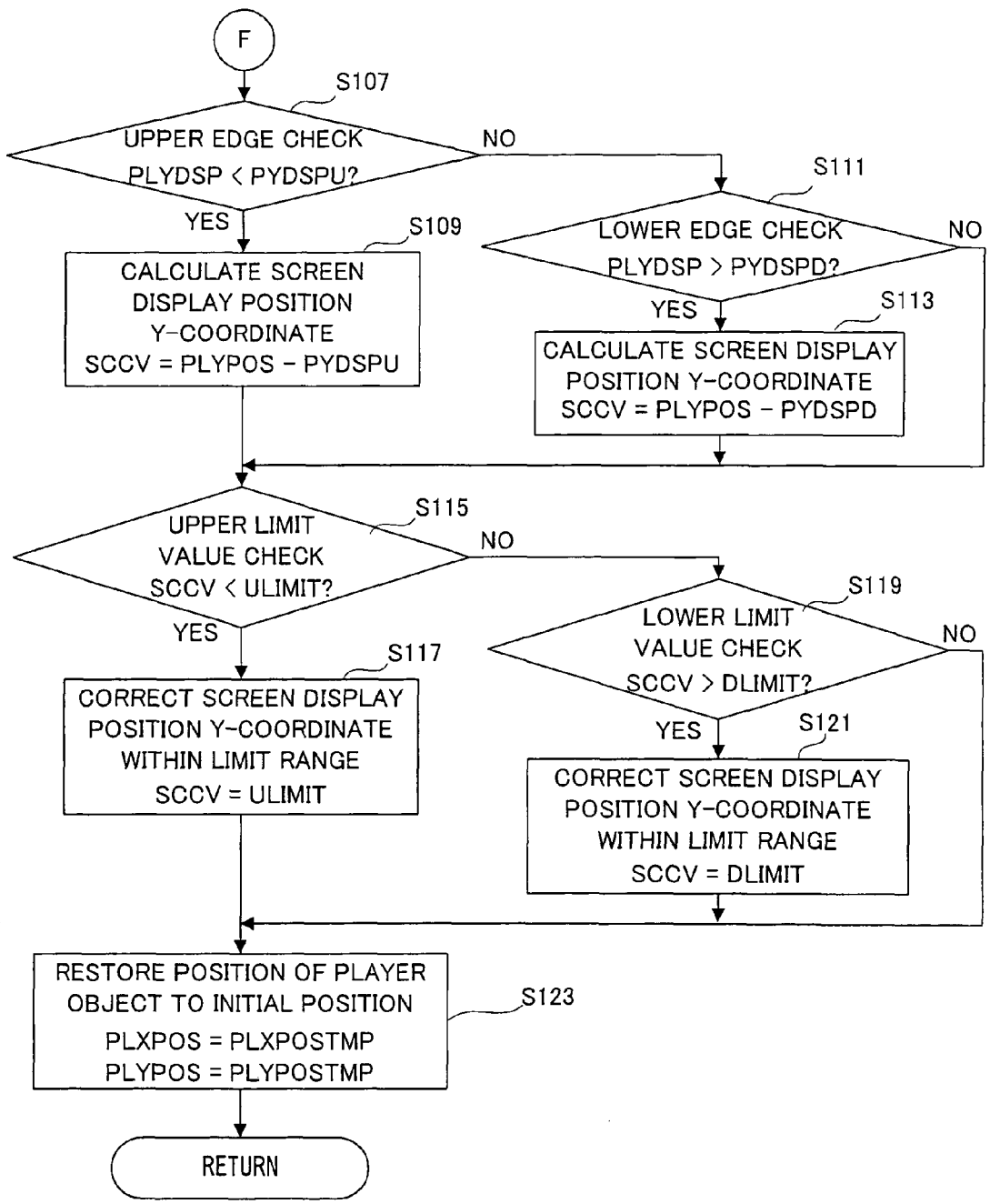

GAME DEVICE AND STORING MEDIUM THAT STORES GAME PROGRAM

This application claims priority to JP Application No. 2003-132522, filed 12 May 2003. The entire contents of this application are incorporated herein by reference.

FIELD

The illustrative embodiments relate to a game device and a storage medium that stores a game program. More specifically, the illustrative embodiments relate to a game device and a storage medium that stores a game program in which a background image having a plurality of scenes, and an area larger than a display screen, displayed on a display, in each scene, is displayed on the display by scrolling.

BACKGROUND AND SUMMARY OF THE INVENTION

Conventionally, there is a game device in which the scene is switched to a different scene, when a player object enters a doorway (exit or entrance) such as a drainpipe, etc., in a certain scene (stage). In a conventional game device of this kind, when the scene is switched to the different scene, the player object is always displayed in the same position on a display screen. Then, the display screen is scrolled in a direction in which to proceed, automatically and without an operation of a player, at a time that the player object enters the entrance in the scene yet to be switched, or after being switched, a display position in the switched scene is maintained until the operation by the player, and the display screen is scrolled in the direction of the operation when the operation is made, and so forth.

In such prior art, a predetermined display screen always is displayed after a switch, irrespective of the direction in which to proceed of the scene yet to be switched, so that the player finds it difficult to recognize the direction in which to proceed, once in the switched scene. Furthermore if a display area in the direction that the player intends to proceed, in the switched display screen, is narrow, little information is obtained on geography in the direction in which to proceed, enemies, and etc. Consequently, the player cannot recognize what exists in the direction in which to proceed, making it difficult to effectively play the game. In addition, it is unnatural to see the display screen scrolled without any operation after being switched. Furthermore, if the display screen is scrolled in a direction in response to the operation of the player, the predetermined display screen is displayed before the operation is performed, so that as described above, the player finds it difficult to recognize the direction in which to proceed once in the switched scene this makes the game difficult to play.

SUMMARY OF THE INVENTION

The illustrative embodiments provide a game device and storage medium that stores a game program.

The illustrative embodiments also provide a novel game device, and storage medium that stores a game program wherein it is easy to recognize a direction in which to proceed, easy to recognize what exists in a direction in which to proceed, and capable of displaying a screen making the game easy to play.

A game device according to the illustrative embodiments is a game device in which a background image, having a plurality of scenes and an area, larger than a display screen displayed on a display in each scene, is displayed on the display by scrolling. The game device comprises an operating means, a player object generating means, a background image generating means, a position detecting means, a scene switching means, a direction in which to proceed detecting means, an adjusting means, and a displayed data generating means. In this game device, the operating means is operated by a player. The player object generating means generates a player object operated based on an operation input from the operating means. The background image generating means generates the background image, displayed in a scrolling manner based on a movement of the player object. The position detecting means detects a position of the player object. The scene switching means switches the scene from a certain scene to another scene when detected at least by the position detecting means that the player object exists in a predetermined position. The direction in which to proceed detecting means detects the direction in which the player object is to proceed in a switched by the scene switching means. The adjusting means adjusts the position of the display screen in the switched scene based on the direction detected by the direction in which to proceed detecting means. Furthermore, the displayed data generating means generates displayed data, based on the position of the display screen adjusted by the adjusting means when the scene is switched by the scene switching means, for displaying the display screen on the display, including the player object generated by the player object generating means and the background image generated by the background image generating means.

More specifically, the game device (10: reference numeral used for illustrative purposes only.) allows a background image (104), having a plurality of scenes and larger than a display screen (106) displayed on a display (16) in each scene, to be displayed on the display by scrolling. In this game device, the operating means (18-30, 32) is operated by a player. The player object generating means (40, 62c, S5) generates a player object (108) operated based on an operation input from the operating means. The background image generating means (40, 64a, S1, S13) generates the background image, displayed in a scrolling manner, based on a movement of the player object. The position detecting means (40, 62a, S19) detects a position of the player object. The scene switching means (40, 64c, S21) switches the scene from a certain scene to another scene, when detected at least by the position detecting means that the player object exists in a predetermined position. Herein, the predetermined position for switching the scene may be a position of an entrance (112), or a position adjacent thereto, etc., for example. The direction in which to proceed detecting means (40, 62b, S31, S39, S43-S49, S53) detects a direction in which the player object is to proceed, in a scene switched by the scene switching means. The adjusting means (40, 64c, S61-S65, S71-S73, S107-S113) adjusts a position of the display screen in the switched scene based on the direction detected by the direction in which to proceed detecting means. Furthermore, the displayed data generating means (40, 66, 68, S9-S11, S15) generates displayed data, for displaying the display screen, including the player object generated by the player object generating means and the background image generated by the background image generating means, on the display, based on the position of the display screen adjusted by the adjusting means when the scene is switched by the scene switching means.

Therefore, according to an illustrative embodiment, when the scene is switched, the direction in which to proceed in the switched scene is detected, and the position of the display screen is adjusted based on the detected direction so that it is possible to generate and display the display screen on which the direction in which to proceed is reflected. Therefore, the direction in which to proceed is easily grasped, and in addition, it is easy to understand what exists in the direction in which to proceed based on the display screen, thus making the game easy for the player to play, based on the screen display.

In a certain illustrative embodiment, the direction in which to proceed detecting means detects the direction in which the player object is to proceed, in a scene yet to be switched, as the direction in which the player object is to proceed in the switched scene. The adjusting means adjusts the position of the display screen based on the direction in which to proceed, in the scene yet to be switched, detected by the direction in which to proceed detecting means.

More specifically, the direction in which to proceed detecting means (S31) detects the direction in which the player object is to proceed, in a scene yet to be switched, as the direction in which the player is to proceed in the switched scene. If the game (114) has no directionality in the switched scene, for example, the direction in which to proceed, in the scene yet to be switched, is adopted as the switched direction. In addition, the adjusting means adjusts the position of the display screen based on the direction in which to proceed, in the scene yet to be switched, detected by the direction in which to proceed detecting means. In this case, the direction in which to proceed is made equal before and after the scene is switched, so that it is possible to display a screen making the game easier to play.

In another illustrative embodiment, the direction in which to proceed detecting means detects the direction of an exit in the switched scene as the direction in which to proceed in the switched scene. The adjusting means adjusts the position of the display screen based on the direction of the exit detected by the direction in which to proceed detecting means.

More specifically, the direction in which to proceed detecting means (S43-S47, S53-S57) detects the direction of an exit (114) in the switched scene as the direction in which to proceed in the switched scene. That is, if a drainpipe of a horizontal direction or a drainpipe of a vertical direction has a directionality, for example, the switched direction in which to proceed is forcedly adjusted to the direction of the exit. In addition, the adjusting means adjusts the position of the display screen based on the direction of the exit detected by the direction in which to proceed detecting means. In this case, it is possible to generate a display screen on which the direction in which to proceed is reflected based on a situation of the switched scene.

Furthermore, in a certain illustrative embodiment, the adjusting means adjusts the position of the display screen in such a manner that a display area, on the side of the screen corresponding to the direction in which to proceed in the switched scene, is rendered as large as possible. In this case, the direction in which to proceed becomes easy to understand, and in addition, it is possible to increase information obtained from the side, such as the geography, an enemy, and etc. This enables a player to easily determine what operation to perform next, thus making the game easier for the player to play after the scene is switched.

Furthermore, in another illustrative embodiment, the adjusting means calculates an adjusting position based on position data of the player object in the switched scene. In this case, the adjusting position may be calculated and adjusted as required when a switching of the scene is needed so that the volume of data is kept small.

In a certain aspect, the game device further comprises an adjusted position data storing means for storing adjusted position data correlated with each direction in which to proceed in the switched scene. The adjusting means sets the adjusted position data corresponding to the direction, detected by the direction in which to proceed detecting means, to the position of the display screen.

More specifically, the adjusted position data storing means (52, 48) stores adjusted position data correlated with each direction in which to proceed in the switched scene. In addition, the adjusting means sets the adjusted position data corresponding to the direction in which to proceed, detected by the direction in which to proceed detecting means, to the position of the display screen. In this case, it is possible to determine a free screen position, adjusted to the direction in which to proceed, by each switched scene, and display the display screen, suited to a situation, by each switched scene.

In another illustrative embodiment, the scene switching means switches the scene from a certain scene to another scene, when the position detecting means detects that the player object exists in a predetermined position, and when there is a predetermined operation from the operating means. In this case, it is possible to cause the scene to be switched only when the operation for the scene switching is explicitly performed.

A storage medium that stores a game program according to an illustrative embodiment is a storage medium that stores a game program to be executed by a game device provided with an operating means operated by a player, and in which a background image having a plurality of scenes, and an area, larger than a display screen displayed on a display in each scene, is displayed on the display by scrolling. This game program allows a processor of the game device to execute a player object generating step, a background image generating step, a position detecting step, a scene switching step, a direction in which to proceed detecting step, an adjusting step, and a displayed data generating step. The player object generating step generates a player object, operated based on an operation input from the operating means. The background image generating step generates the background image, displayed in a scrolling manner based on a movement of the player object. The position detecting step detects a position of the player object. The scene switching step switches the scene from a certain scene to another scene, when detected by at least the position detecting step that the player object exists in a predetermined position. The direction in which to proceed detecting step detects a direction in which the player object is to proceed in a switched by the scene switching step. The adjusting step adjusts a position of the display screen in the switched scene, based on the proceeding direction in which to proceed detecting step. The displayed data generating step generates displayed data, for displaying the display screen, including the player object generated by the player object generating step and the background image generated by the background image generating step, on the display, based on the position of the display screen adjusted by the adjusting step when the scene is switched by the scene switching step.

In a certain embodiment, the direction in which to proceed detecting step detects the direction in which the player object is to proceed in a scene yet to be switched as the direction in which to proceed in the switched scene. The adjusting step adjusts the position of the display screen, based on the direction in which to proceed detecting step in the scene yet to be switched.

In another illustrative embodiment, the direction in which to proceed detecting step detects the direction of an exit in the switched scene as the direction in which to proceed in the switched scene. The adjusting step adjusts the position of the display screen based on the direction of the exit detected by the direction in which to proceed detecting step.

In addition, in a certain illustrative embodiment, the adjusting step adjusts the position of the display screen in such a manner that a display area, on the side corresponding to the direction in which to proceed in the switched scene, is rendered as large as possible.

Furthermore, in another illustrative embodiment, the adjusting step calculates an adjusting position based on position data of the player object in the switched scene.

In a certain aspect, the game device further comprises an adjusted position data storing means for storing adjusted position data correlated with each direction in which to proceed in the switched scene. In this game program, the adjusting step sets the adjusted position data, corresponding to the direction in which to proceed detecting step, to the position of the display screen.

In another illustrative embodiment, the scene switching step switches the scene from a certain scene to another scene, when detected by the position detecting step that the player object exists in a predetermined position, and when there is a predetermined operation from the operating means.

By these storing media that store the game program, the direction in which to proceed is easily grasped, and in addition, it is possible for the player to easily understand what exists in the direction in which to proceed, thus making it possible for the player to easily play the game, based on the screen display, similar to the above-described game device.

According to an illustrative embodiment, when the scene is switched, it is possible to display the display screen, in which the direction in which to proceed in the switched scene is reflected. Therefore, the direction in which to proceed is easily understood, and in addition, it is possible to display a screen making it easy to understand what exists in the direction in which to proceed, thus making it possible for the player to more easily play the game, based on the screen display.

The above described aspects of the illustrative embodiments will become more apparent from the following detailed description of the illustrative embodiments when taken in conjunction with the accompanying drawings.

BRIEF DESCRIPTION OF THE DRAWINGS

FIG. 35 is a flowchart showing one portion continued from FIG. 34; and

FIG. 36 is a flowchart showing a continued portion from FIG. 35.

DETAILED DESCRIPTION OF THE ILLUSTRATIVE EMBODIMENTS

Figure 1:
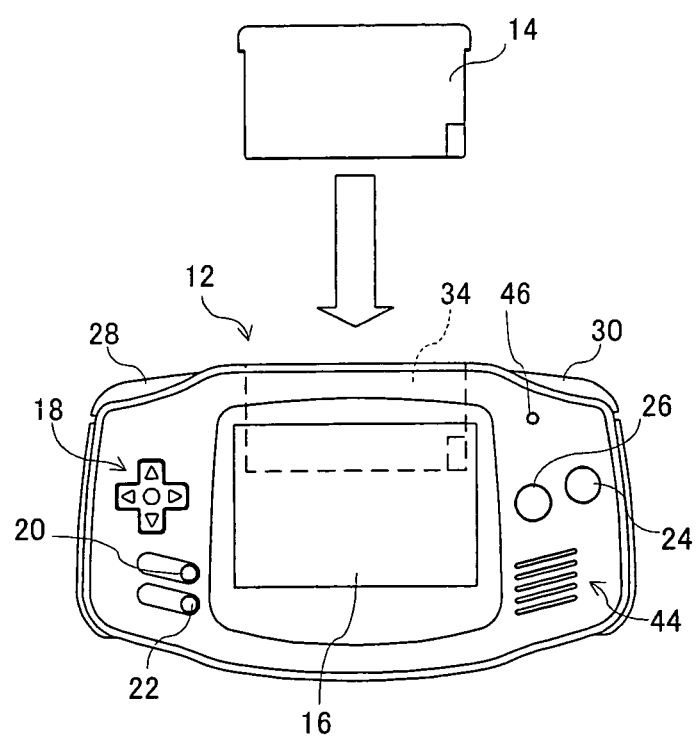
FIG. 1 is an outline view showing a game device of one embodiment of the illustrative embodiments.

A game device 10 of this embodiment shown in FIG. 1 includes a game machine 12 and a cartridge 14 connected to the game machine 12. A handheld game machine, such as GameBoy Advance (GAMEBOY ADVANCE: product name), for example, may be applicable as the game machine 12. It is noted that the game device 10 is not limited to the handheld game machine 12, and a video game machine, used by being connected to a home-use television receiver may also be applicable, for example. In addition, a game information storage medium is not limited to the cartridge 14, and various kinds of information storing media such as an optical information storage medium, such as a CD-ROM, a DVD, etc., a magneto optical disk, or a magnetic disk, etc, may be applicable.

At an approximately center portion of a front surface of a housing of the game machine 12, a color liquid crystal display (LCD) 16 is provided as a display. In this LCD 16, a game image including a game world, a game character, etc., are displayed.

In a front surface of the housing, in a predetermined position at the left of the LCD 16, a cross button 18, a start button 20, and a select button 22 are provided, and in addition, in a predetermined position at the right of the LCD 16, an A button 24 and a B button 24 are provided. Furthermore, on either edge portion, on both the sides of an upper surface (ceiling surface) of the housing, an L button 28 and an R button 30 are provided. Each of these buttons is operating means for a user to operate a game, and they are collectively shown as an operating portion 32 in FIG. 2.

The cross button 18 functions as a direction switch, and by depressing one of four depressing portions, it becomes possible to move a player character (player object), a cursor, etc., displayed on the LCD 16, in vertical and horizontal directions. The start button 20 is used for instructing the starting of the game, and so forth, and the select button 22 is used for selecting a game mode, and so forth. Primarily, the A button 24 is used for selecting (determining) an item designated by the cursor, and so forth, and the B button 26 is used for canceling the selected item, and so forth. In addition, as a result of being operated one-by-one or in combination with the other buttons, the A button 24, the B button 26, the L button 28, and the R button 30 are capable of allowing the player object displayed on the LCD 16 to perform certain actions, which are previously determined by each operation, such as throw, catch, jump, cut with a sword, start talking, and so forth.

A slot 34 is provided on a far side of the upper surface of the housing, and the cartridge 14 is inserted into this slot 34 and thus is detachably mounted. Inside the slot 34 and in an inserting direction edge portion aperture of the cartridge 14, a connector 36 and a connector 38 (FIG. 2), capable of being connected to each other, are respectively provided. Therefore, when the connector 36 and the connector 38 are connected, the cartridge 14 is rendered accessible by a CPU 40 (FIG. 2) of the game machine 12. Furthermore, on a near side of the upper surface of the housing, an external expansion connector (communication-use connector) 42 (FIG. 2) is provided. To this connector 42, a communication cable (not shown) is connected at a time of performing an interactive play, for example.

Below the A button 24 and the B button 26, on the front surface of the housing, a speaker 44 is provided, and a game voice or a game sound, such as a BGM sound effect, etc., is output during the game. In addition, above the A button 24 and the B button 26, a power lamp 46, which is lit as a result of its switch being turned on, and whose color changes according to a remaining amount of battery power, is provided.

Furthermore, although not illustrated, a battery containing box, in which a battery is set, is provided at a back of a case, and on a bottom surface of the case, a power switch, a sound volume adjusting knob, a headphone connecting terminal, etc., are provided.

Figure 2:
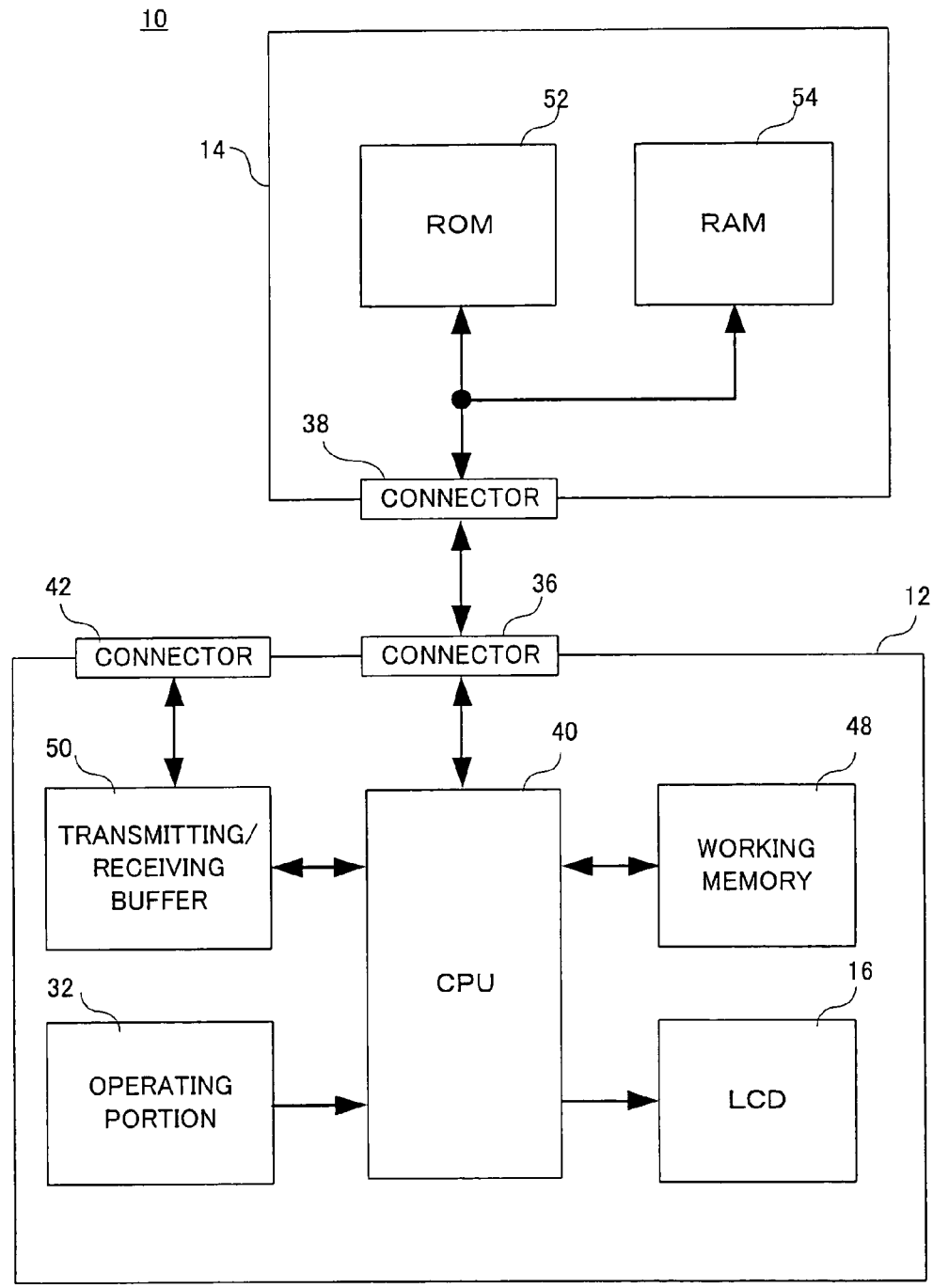
FIG. 2 is a block diagram showing one example of internal structure of the game device in a FIG. 1 embodiment.

In FIG. 2, electric structure of this game device 10 (game machine 12 and the cartridge 14) is illustrated. Referring to this FIG. 2, the game machine 12 includes the CPU 40, and this CPU 40 is also referred to as a processor or a computer, etc. This CPU 40 is responsible for controlling the whole game machine 12. The above-described LCD 16, the operating portion 32, and the connector 36 are connected to the CPU 40; via an internal bus, and a working memory 48, a transmitting/receiving buffer 50, etc., are also connected.

A display signal is applied from the CPU 40 to the LCD 16, so as to display a game image. It is noted that although not illustrated, a VRAM, an LCD controller, etc., are connected to the CPU 40, and under instruction of the CPU 40, background image data, character image data, and game image data are rendered in the VRAM. In addition, the LCD controller reads out the game image data (displayed data) rendered in the VRAM according to an instruction of the CPU 40, and displays a character, a game screen (display screen), etc., on the LCD 16. In this embodiment, the VRAM has a storage area larger than a screen displayed on the LCD 16.

The operating means 32 includes each of the above-described operating buttons 18, 20, 22, 24, 26, 28, and 30, and is capable of applying an operation input signal corresponding to an operation of each of these operating buttons to the CPU 40. Therefore, the CPU 40 executes a process according to an instruction of a player (user), which is applied through the operating portion 32.

The working memory 48 is a writable/readable memory, and used as a work area and a buffer area of the CPU 40. The transmitting/receiving buffer 50 is a buffer for temporarily storing transmitting/receiving data, when playing an interactive multiplayer game, for example, and is connected to the external expansion connector 42. As a result of the connector 42 being connected to another game machine 12, using a communication cable not shown, it is possible to perform a data transmission among a plurality of the game machines 12.

In addition, although not illustrated, the speaker 46 is connected to the CPU 40 via a sound circuit, and a sound signal is applied to the sound circuit from the CPU 40 so as to output the game sound, such as the game music, and the sound effects, from the speaker 46.

A ROM 52 and a RAM 54 are contained in the cartridge 14. The ROM 52 and the RAM 54 are connected to each other via the bus and are connected to the connector 38. Therefore, as described above, when the cartridge 14 is attached to the game machine 12, the connector 38 and the connector 36 are connected, which allows the CPU 40 to be electrically connected to the ROM 52 and the RAM 54. Therefore, the CPU 40 is capable of reading out predetermined program data from a predetermined area of the ROM 52, expanding the program data in the working memory 48, reading out predetermined backup data from the RAM 54, writing the backup data into the working memory 48, writing into a predetermined area of the RAM 54 the game data generated in the working memory 48 corresponding to a proceeding situation of the game, and saving the game data, and so forth, for example.

It is noted that although a flash memory, which is a non-volatile memory, may be used for the RAM 54, a ferroelectric memory (FeRAM), an EEPROM, etc., may be adopted as another non-volatile memory. In addition, an SRAM and a DRAM, etc., that uses the battery may be used for the RAM 54.

Figure 3:
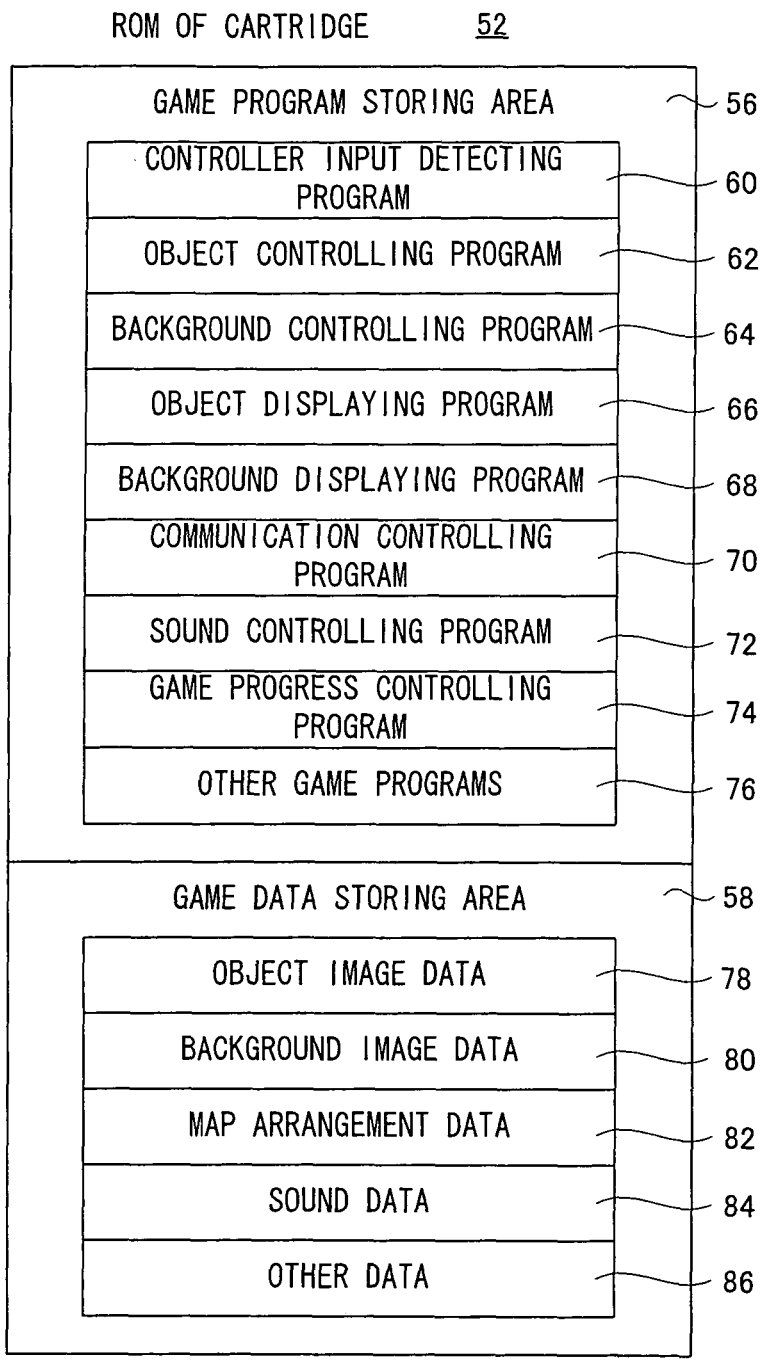
FIG. 3 is an illustrative view showing one example of a memory map of a cartridge ROM in FIG. 2.

As shown in FIG. 3, the ROM 52 includes a game program storing area 56 and a game data storing area 58. A controller input detecting program 60, an object controlling program 62, a background controlling program 64, an object displaying program 66, a background displaying program 68, a communication controlling program 70, a sound controlling program 72, a game progress controlling program 74, and other game programs 76, etc., are stored in advance in the game program storing area 56. Object image data 78, background image data 80, map arrangement data 82, sound data 84, and other data 86, etc., are stored in advance in the game data storing area 58.

Figure 4:
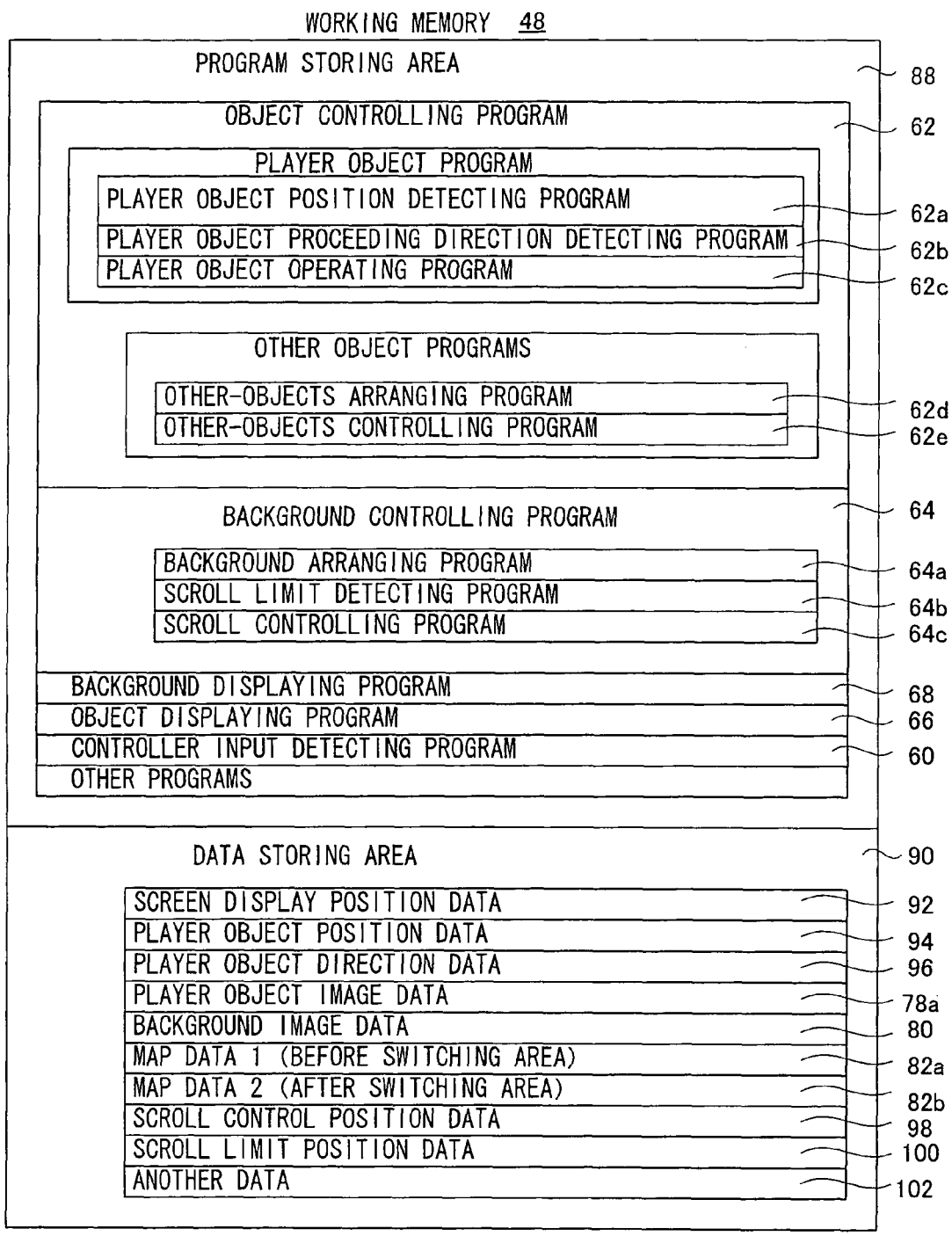
FIG. 4 is an illustrative view showing one example of the memory map of a working memory in FIG. 2.

In FIG. 4, one example of the memory map of the working memory 48 is illustrated. The working memory 48 includes a program storing area 88 and a data storing area 90. The game program read out from the ROM 52 of the cartridge 14 is stored all at once or partially and sequentially in the program storing area 88. That is, the object controlling program 62, the background controlling program 64, the background displaying program 68, the object displaying program 66, a controller input detecting program 60, and other programs (70, 72, 74, 76, etc.) are stored in the program storing area 88. The CPU 40 executes the game process according to the game programs. The object controlling program 62 includes a program for controlling each of the player object (moving image character operable by the player) and other objects (enemy object, background object, etc.). More specifically, a player object position detecting program 62a, a player object direction in which to proceed detecting program 62b, a player object operating program 62c, Other-objects arranging program 62d, other-objects controlling program 62e, etc., are included. The background controlling program 64 includes a background arranging program 64a, a scroll limit detecting program 64b, a scroll controlling program 64c, etc.

In addition, the game data read out from the ROM 52 of the cartridge 14 and the game data generated during the game area stored in the data storing area 90. That is, screen display position data 92, player object position data 94, player object direction data 96, player object image data 78a, background image data 80, first map data 82a before an area (scene) is switched, second map data 82b after the area is switched, scroll control position (parameter) data 98, scroll limit position data 100, other data 102, etc., are stored in the game data storing area 90. In other data 102, image data 78 of the object other than the player object, the sound data 84, other data 86, another game data necessary for a proceeding of the game, flag data, etc., are stored.

The player object position detecting program 62a is a program for detecting a position of the player object in a game world. The player object direction in which to proceed detecting program 62b is a program for detecting the direction in which the player is to proceed before the area is switched, and the direction in which to proceed in the scene after the area is switched. The player object operating program 62c is a program for moving the player object based on an operation input from the operating portion 32. Other-objects arranging program 62d is a program for arranging other objects (enemy object, etc.,) in the game world, and other-objects controlling program 62e is a program for moving other objects.

Figure 5:
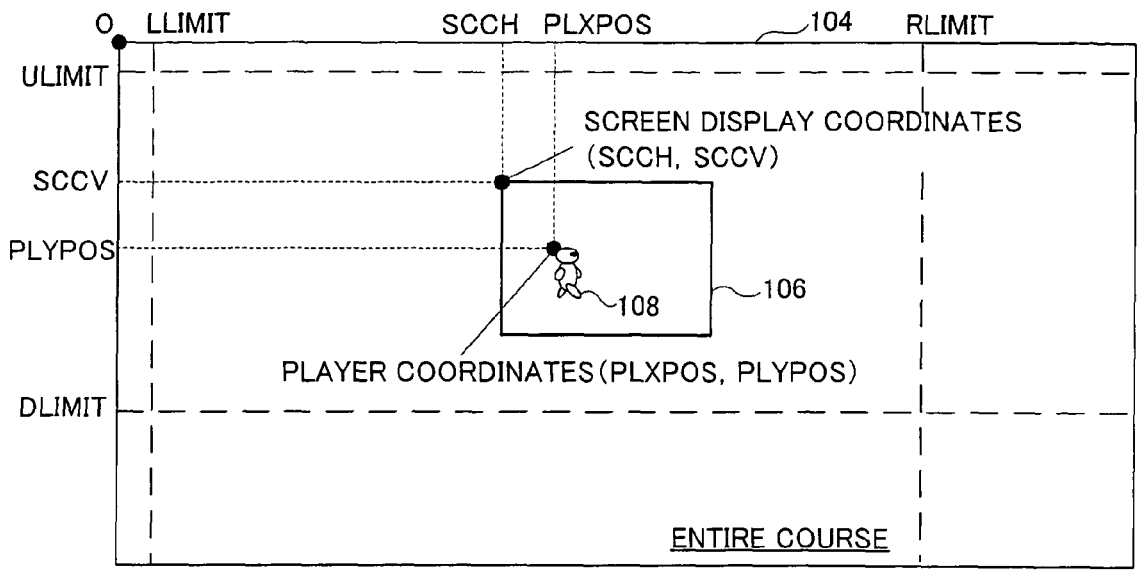
FIG. 5 is an illustrative view showing a relationship between a background image (entire course) and a screen position in the FIG. 1 embodiment.

In addition, the background arranging program 64a generates a background image 104 based on the background image data 80, the map data 82, etc., as shown in FIG. 5. The map data 82 is data for indicating what background (a geography such as a wall, a foothold, etc., a movable area, etc.) is arranged in one grid or a unit in a map divided by a grid, for example. The background image 104 is an image that corresponds to an entire scene, such as one course, or a stage, etc., for example, and an area, larger than the display screen 106 displayed on the LCD 16. It is noted that in this game device 10, there are a plurality of the scenes, so that in the ROM 52, a plurality of the map data 82 are stored. Furthermore, in each scene, the background image, larger than the display screen, is displayed on the display by scrolling the display screen area.

The scroll limit detecting program 64b is a program for detecting whether or not the display screen 106 exists within a range of a scroll limit value set to an edge portion of the background image 104. The scroll controlling program 64c is a program for controlling a movement of the display screen 106, and adjusts the movement of the screen display position of the display screen 106 in conjunction with the movement of the player object 108, for example, for keeping the player object 108 within the display screen 106. Furthermore, when switching the scene, the scroll controlling program 64c adjusts the screen display position of the display screen 106 based on the position, the direction in which to proceed, etc., of the player object 108 in the switched scene.

In addition, each of the background displaying program 68 and the object displaying program 66 is a program for generating the displayed data of the display screen 106, including the background image 104 and the object image, to be displayed on the display 16. The controller input detecting program 60 is a program for detecting and obtaining the operation input signal generated in the operating portion 32 by an operation input by the player.

As shown in FIG. 5, the screen display position data 92 includes position coordinates data of the display screen (game screen) 106 in the background image 104. The screen display position is indicated by an X-coordinate SCCH and a Y-coordinate SCCV using a constant point O (in this embodiment, upper left corner) of the background image 104 as the origin. In addition, using this screen display position (SCCH, SCCV) as a reference point of the display screen 106, a display range having a predetermined length (dot) in each X direction (right direction in FIG. 5) or Y direction (lower direction in FIG. 5) from this point is the display screen 106. An initial value in the course is set in advance as the screen display position data 92. Furthermore, the screen display position data 92 is updated by being moved in conjunction with the movement of the player object 108, and so forth, and if the player object 108 approaches an edge of the display screen 106, for example, etc., for keeping the player object 108 within the display screen 106. In addition, in this game device 10, the screen display position data 92 is adjusted based on the position, the direction in which to proceed, etc., of the player object 108 when the scene is switched.

As FIG. 5 shows, the player object position data 94 is position coordinates data of the player object 108 in the background image 104, and is indicated by an X-coordinate PLXPOS and a Y-coordinate PLYPOS using the constant O as the origin. The initial value in the course is set in advance as the player object position data 94. Furthermore, the player object position data 94 is updated based on the operation input from the operating means 32 obtained by the controller input detecting program 60, the player object operating program 62c, etc. In addition, the player object direction data 96 is data for facing direction or the direction in which the player object 108 is to proceed. Its variable PLMUKI is set to 0 when the player object faces to left, and 1 when the player object faces to right, for example.

The first map data 82a is map data of the scene yet to be switched. The second map data 82b is map data of the switched scene, and the switched map data is loaded from the ROM 52 when the switching operation occurs.

The scroll controlling position data 98 is data used for adjusting the screen display position of the display screen 106 when the scene is switched, and when there are a plurality of portions for switching the scene in the course, for example, the scroll controlling position data 98 is stored in the ROM 52 in advance by each portion to be switched. The scroll controlling data 98 includes following parameters for adjusting in right and left (horizontal) directions, that is, an X-coordinate left-side parameter PXDSPLL when the player faces to left, an X-coordinate right-side parameter PXDSPLR when the player faces to left, an X-coordinate right-side parameter PXDSPRR when the player faces to right, and an X-coordinate left-side parameter PXDSPRL when the player faces to right.

Figure 6:
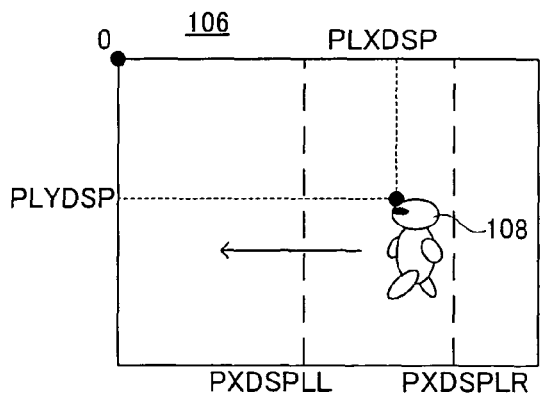
FIG. 6 is an illustrative view showing a parameter for a screen adjustment in a horizontal direction when a direction in which to proceed in a switched scene faces to left.

PXDSPLL and PXDSPLR are applied for adjusting the screen position when the direction in which the object 108 is to proceed faces to left in the scene after switching the scene, as shown in FIG. 6 set on the display screen 106. That is, the parameters, if facing to the left, are defined in the X-coordinate of a coordinate system in which the screen display position of the display screen 106 is used as the origin. In addition, PXDSPLR is set to a right edge portion of the display screen 106, PXDSPLL is set to an approximately center of the display screen 106, and a range sandwiched by these coordinates is arranged on a slightly right side of the display screen 106. To adjust the screen position, it is determined what relationship the X-coordinate of a display position coordinates (PLXDSP, PLYDSP) of the player object 108 has in relation to the parameters PXDSPLL and PXDSPLR. It is noted that the display position coordinates (PLXDSP, PLYDSP) of the player object 108 are the position coordinates of the player object 108 in the coordinate system in which the screen display position (SCCH, SCCV) of the display screen 106 is the origin.

Figure 7:
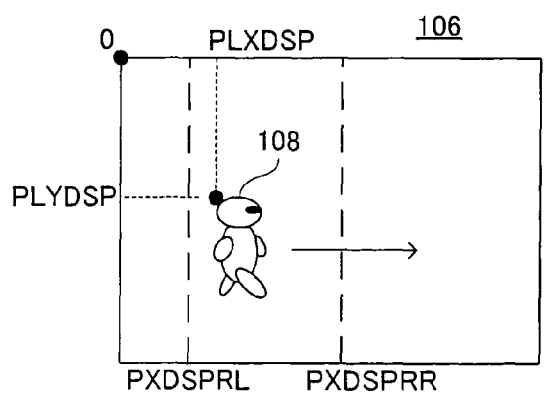
FIG. 7 is an illustrative view showing a parameter for the screen adjustment in the horizontal direction when the direction in which to proceed in the switched scene faces to right.

On the other hand, PXDSPRR and PXDSPRL are applied when the direction in which to proceed of the player object 108 faces to the right in the scene after switching the scene. These right-facing parameters are set on the display screen 106 as shown in FIG. 7, that is, the parameters are defined in the X-coordinate of a coordinate system in which the screen display position of the display screen 106 is the origin. In addition, PXDSPRL is set to a left edge portion of the display screen 106, PXDSPRR is set to an approximately center of the display screen 106, and a range sandwiched by these coordinates is arranged on a slightly left side of the display screen 106. Furthermore, to adjust the screen position, it is determined what relationship the X-coordinate PLXDSP of the display position coordinates of the player object 108 has relative to the parameters PXDSPRR and PXDSPRL.

Figure 8:
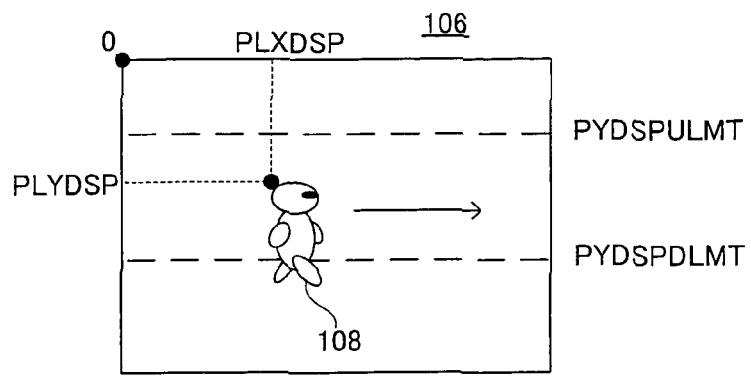
FIG. 8 is an illustrative view showing a parameter for the screen adjustment in a vertical direction in the switched scene.

In addition, to make adjustments in upward and downward (vertical) directions, the scroll control position data 98 includes a player Y-coordinate upper-side parameter PYDSPU a player Y-coordinate lower-side parameter PYDSPD, a player Y-coordinate upper-side parameter limit value PYDSPULMT and a player Y-coordinate lower-side parameter limit value PYDSPDLMT. These vertical adjustment-use parameters are also set relative to the display screen 106 as shown in FIG. 8, that is, these parameters are defined in the Y-coordinate of a coordinate system in which the screen display position of the display screen 106 is the origin. Using PYDSPU and PYDSPD as a reference, the screen display position is adjusted in the upward and downward directions. To adjust the screen position, it is determined what relationship the Y-coordinate PYDSPD of the display position coordinates of the player object 108 has relative to the parameters PYDSPU and PYDSPD. It is noted that PYDSPULMT and PYDSPDLMT, which are the limit values, may be set to each parameter PYDSPU and PYDSPD. However, in this illustrative embodiment, when the direction in which to proceed of the upward and downward directions is determined in the scene after switching the scene, the limit value PYDSPDLMT is not applied to the lower-side parameter PYDSPD in order to adjust toward only the lower side when the direction in which to proceed is upward. Similarly, the limit value PYDSPULMT is not applied to the upper-side parameter PYDSPU in order to adjust toward only the upper side when the direction in which to proceed is downward.

The scroll limit position data 100 is data for limiting the screen display position of the display screen 106 in order for the display screen 106 to be contained within the background image 104, and as shown in FIG. 5, it includes a scroll left limit-value LLIMIT, a scroll right limit-value RLIMIT, a scroll upper limit value ULIMIT, and a scroll lower limit value DLIMIT. This scroll limit position data 106 is stored in advance, by each course or scene, for example.

In this game device 10, in the area yet to be switched, the area switch is performed when the player object 108 is located at the entrance for switching the area. Or, the area switch may be performed when a predetermined operation is further performed at the position, that is, only when the player performs the secured area switching operation, does the area switch occur. A drainpipe, a door, etc., may be applied to the entrance for the area switch, or any arbitrary thing may be applied as well.

If the area switch occurs, the direction in which the player object 108 is to proceed in the switched area is detected, and based on the direction in which to proceed, the screen display position of the display screen 106 is adjusted.

The direction in which the player object 108 is to proceed in the switched area differs, depending on the presence or absence of a directionality of the exit in the switched area. That is, when the exit in the switched area is a door, etc., that has no directionality, the direction in which the player object 108 is to proceed in the area yet to be switched is detected, and this direction is adopted as the direction in which to proceed in the switched area. This makes the direction in which the player object 108 proceeds, before and after switching the area, equal. On the other hand, when the exit in the switched area is a thing having horizontal directionality, such as a drainpipe that faces to left or right, the direction in which the player object 108 is to proceed is forcedly adjusted to the direction of the exit, so that the direction (left or right) of the exit is directly adopted as the direction in which the player object 108 is to proceed in the switched area. In addition, when the exit in the switched area is a thing having upward or downward directionality, such as a drainpipe that faces an upward or downward direction, the direction (left or right) in which the player object 108 has been proceeding in the area yet to be switched is detected, and this direction is adopted as the direction in which to proceed horizontally in the switched area. Additionally, the direction (upward or downward) of the exit in the switched area is adopted as the direction in which to proceed vertically in the switched area. Thus, it is possible to adopt the direction in which to proceed according to a situation of the switched area.

Thereafter, based on the direction in which to proceed of the player object 108 of the switched area, the screen display position of the display screen 106 is adjusted in such a manner that the background image on the side of direction in which to proceed is rendered as large as possible. In addition, the display screen 106, according to the adjusted screen display position, is displayed on the display 16. Therefore, it is possible for the player to easily grasp the direction in which to proceed in the switched area, and in addition, the side of the direction in which to proceed is adjusted to be as large as possible, allowing the player to easily see what exists on the side of the direction in which to proceed.

Figure 9:
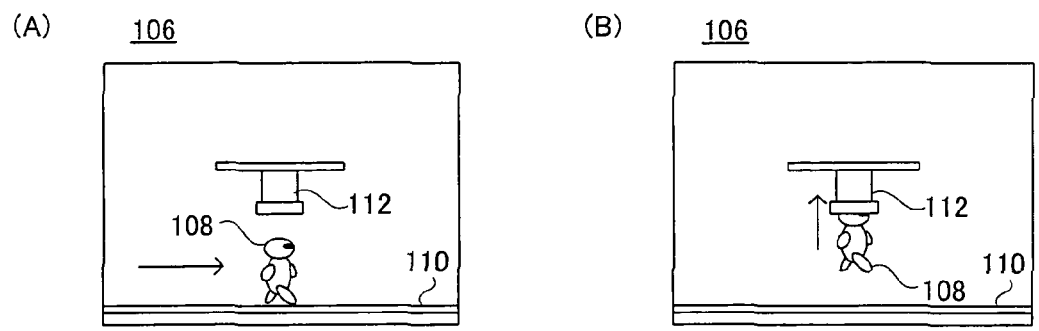
FIG. 9 is an illustrative view showing one example of an operating manner for an area switch in a scene yet to be switched, (A) shows a right-facing moving manner toward a predetermined position, and (B) shows a predetermined operating manner in the predetermined position.

More specifically, in FIG. 9, the display screen 106 in the area yet to be switched is displayed. On this display screen 106, in the air above a ground 110, a downward-facing drainpipe is arranged as the entrance 112 for switching the area, for example. In FIG. 9 (A), as a result of the player depressing a right side of the cross button 18 of the operating portion 32 for example, the player object 108 moves from the right side to the left side on the display screen 106, and reaches the vicinity of a lower area of the entrance 112 in a right-facing posture. Then, as shown in FIG. 9 (B), in the position below the downward-facing drainpipe 112, the player object 108 jumps and enters the entrance 112, as a result of the player depressing the A button 24 of the operating portion 32, for example, which switches the area. In this area yet to be switched, the direction in which the player object 108 is to proceed faces to the right, as understood from FIG. 9.

Figure 10:
FIG. 10 is an illustrative view showing one example of a manner that a player object is forcedly moved in a switching destination, (A) shows an initial position of the player object in the switched scene, and (B) shows a position after being forcedly moved.

As shown in FIG. 10, an upward-facing drainpipe is arranged as the exit 114 of an area switching destination in the map of the switched area, for example. As shown in FIG. 10 (A), an initial value of the position of the player object 108 of the switched area is set in such a manner so as to be hidden within the upward-facing drainpipe 114, for example, and after the switched display screen 106 is displayed, as shown in FIG. 10 (B), the player object 108 is forcedly moved above the upward-facing drainpipe 114 and comes out automatically. Thus, when the switched exit 114 accompanies a forced movement such as the drainpipe, etc., the player cannot operate the player object until after the forced movement of the player object 108 is ended, so that the adjustment of the screen position of the display screen 106 is performed based on the position of the player object 108 after the forced movement, as shown in FIG. 10 (B).

Figure 11:
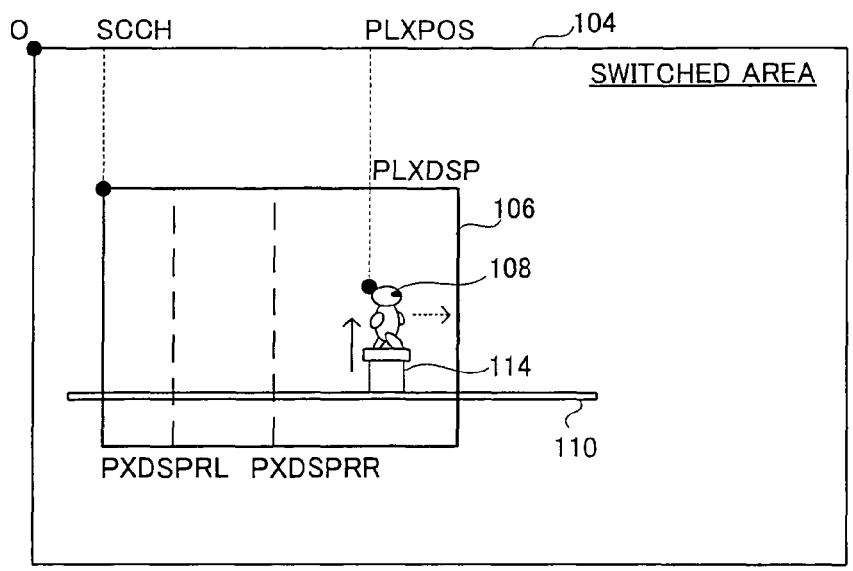
FIG. 11 is an illustrative view for describing the screen adjustment in the horizontal direction in a case that the direction in which to proceed faces to right in the switched scene, (A) shows a manner that the player object is arranged slightly to the right of the display screen, and (B) shows an adjusted display screen position in the horizontal direction.
Figure 11:
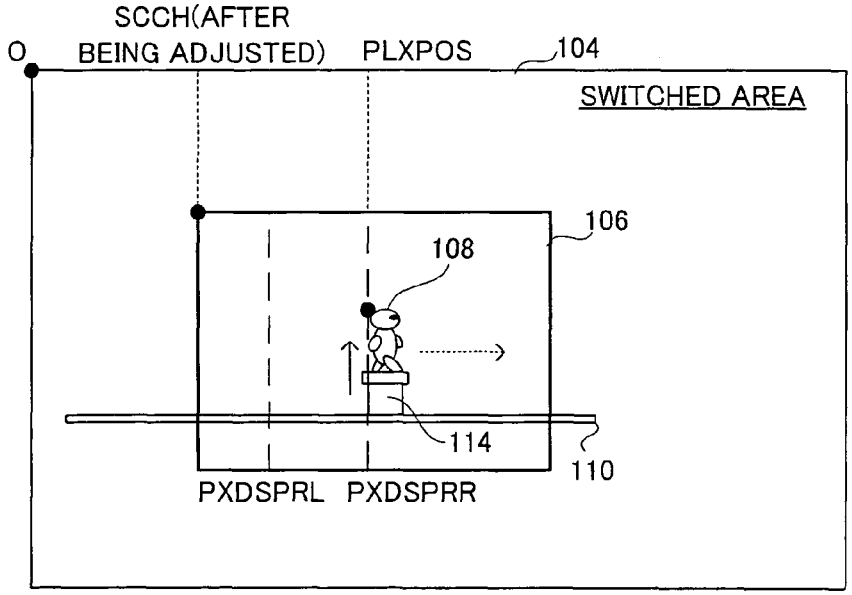

First, the screen position adjustment of the horizontal direction will be described. As shown in FIG. 9, when an operation for switching the area is performed, the background image 104 of the switched area is generated based on the map data 82b of the switched area, as shown in FIG. 11 (A), and the ground 110, the exit 114, etc., are arranged in a predetermined position. The player object 108 is arranged in the initial value of the position (PLXPOS, PLYPOS) of the player object 108 stored in advance and determined based on the position in which the player object 108 has just come out of the drainpipe 114, as described above. In addition, the display screen 106 is set based on the initial value of the screen display position (SCCH, SCCV) of the switched area, stored in advance. In addition, this exit 114 is the upward-facing drainpipe so that the direction in which the player object 108 had been proceeding in the area yet to be switched, is adopted as the horizontal direction in which the switched player object 108 is to proceed. Therefore, the X-coordinate right-side parameter PXDSPRR when the player faces to the right and the X-coordinate left-side parameter PXDSPRL when the player faces to the right are set to the scroll controlling parameter for adjusting the horizontal direction, that is, the parameter when facing to the right.

In this FIG. 11 (A), the position of the exit 114, which is the area switching destination, and an initial position (after the forced movement) of the switched player object 108 are set in such a manner so as to be on a slightly right edge portion of the display screen 106. Therefore, the display area of the direction in which the player object 108 is to proceed (indicated by a dotted arrow) is narrow, and if the switched display screen 106 is displayed as it is, so little information is seen in the direction in which to proceed that the player cannot know the game situation in that direction. Consequently, when this occurs, the adjustment of the screen display position is executed. More specifically, by a right edge check using the X-coordinate right-side parameter PXDSPRR when the player faces to the right, it is determined whether or not the display position X-coordinate PLXDSP of the player object 108 is larger than PXDSPRR. As a result, when PLXDSP is larger than PXDSPRR, as shown in FIG. 11 (B), a value of the screen display position X-coordinate SCCH is adjusted so that PLXDSP becomes equal to PXDSPRR, for example. An adjusting position, of the screen display position, is calculated based on the position of the player object 108 and the parameter for the screen adjustment, for example. In this case, the adjusting position may be calculated as required when the scene switch is needed, so that it is possible to keep the volume of data small. This adjustment makes it possible to render the display area of the side of the direction in which the player object 108 is to proceed (indicated by a dotted arrow) larger than it would be if in the initial position of FIG. 11 (A).

Figure 12:
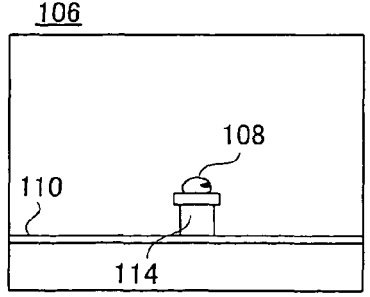
FIG. 12 is an illustrative view showing one example of the display screen having a screen position adjusted in FIG. 11, (A) shows the display screen including the player object arranged in the initial position, and (B) shows the display screen including the player object forcedly moved later.
Figure 12:
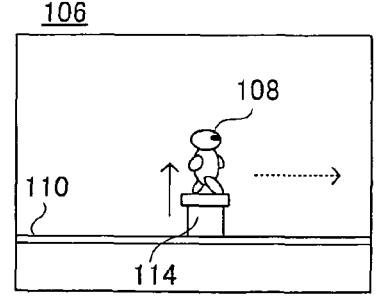

Next, after the area is switched, as shown in FIG. 12 (A), the display screen 106, in which the upward-facing drainpipe 114 and the player object 108 are located at an approximately center, is displayed on the LCD 16. Thereafter, as shown in FIG. 12 (B), a screen in which the player object 108 automatically comes out of the upward-facing drainpipe 114 is displayed.

Thus, after the scene is switched, the display screen is displayed, on which the direction in which the player object 108 is to proceed is reflected, so that it is possible to display a screen which enables the player to easily continue play. More specifically, in this FIG. 12, the player object 108 that faces the direction in which to proceed in the scene yet to be switched is displayed, so that the player can easily understand the direction to proceed, even if the area is switched. Furthermore, the screen display position is adjusted so that the display area on the side of the direction in which to proceed is rendered as large as possible, so that the direction in which to proceed is easy to understand. Additionally, the amount of information obtained from the side of the direction in which to proceed, such as the background image of the geography, the enemy, the item, etc., increases. Therefore, it is possible for the player to easily determine the operation to be performed next, making it easier to play the switched area.

It is noted that in this illustrative embodiment, the X-coordinate PLXDSP of the player display position is adjusted to be equal to the X-coordinate right-side parameter PXDSPRR when the player faces to the right. However, the adjusting position is not always limited thereto, and may be adjusted so that PLXDSP exists within a range of PXDSPRL and PXDSPRR, for example. In addition, PXDSPRR is preferably set as left as possible on the display screen, in order that the display area on the right side, which is the direction in which to proceed, is rendered as large as possible.

Figure 13:
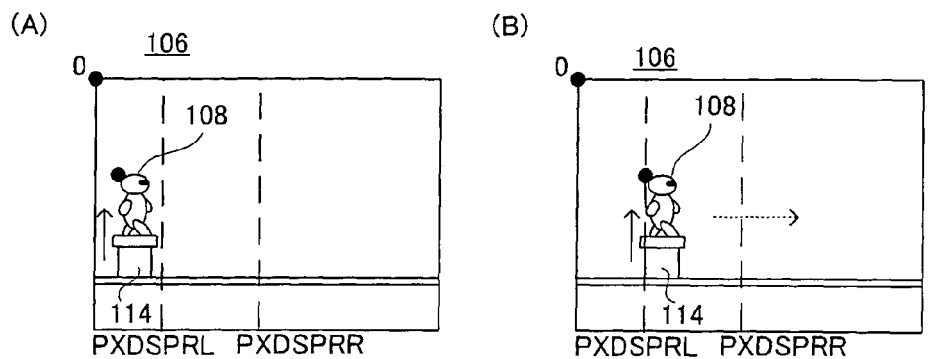
FIG. 13 is an illustrative view for describing a corrective adjustment in the horizontal direction in a case that the direction in which to proceed faces to right in the switched scene, (A) shows a manner that the player object is arranged slightly left of the display screen, and (B) shows the adjusted display screen.

Furthermore, as shown in FIG. 13 (A), if the position of the exit 114, which is the area switching destination, and the initial position of the switched player object 108 are set to a slightly left edge portion on the display screen 106, the display area on the side of the direction in which to proceed is largely secured, so this does not present a problem. However, if the player object 108 is too close to the left edge, it becomes difficult to see, and therefore, in this illustrative embodiment, the screen display position is adjusted. More specifically, in a case that the player display position X-coordinate PLXDSP is smaller than the X-coordinate left-side parameter PXDSPRL when the player faces to the right, the X-coordinate SCCH of the screen display position is adjusted so that PLXDSP is rendered equal to PXDSPRL, or PLXDSP enters the range of PXDSPRL and PXDSPRR as shown in FIG. 13 (B). In this case, too, the display area of the direction in which to proceed is displayed in a sufficiently large portion.

Figure 14:
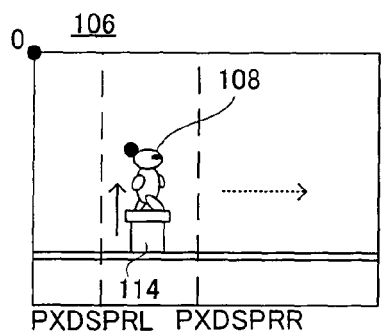
FIG. 14 is an illustrative view showing one example of a manner that the player object is arranged in an approximately center of the display screen in a case that the direction in which to proceed in the switched scene faces to the right.

In addition, as shown in FIG. 14, when the exit 114, which is the area switching destination, and the initial position of the switched player object 108 are set within the range of PXDSPRL and PXDSPRR on the display screen 106, the display area of the direction in which to proceed is displayed in a sufficiently large portion so that the adjustment of the screen display position is not necessarily needed.

Figure 15:
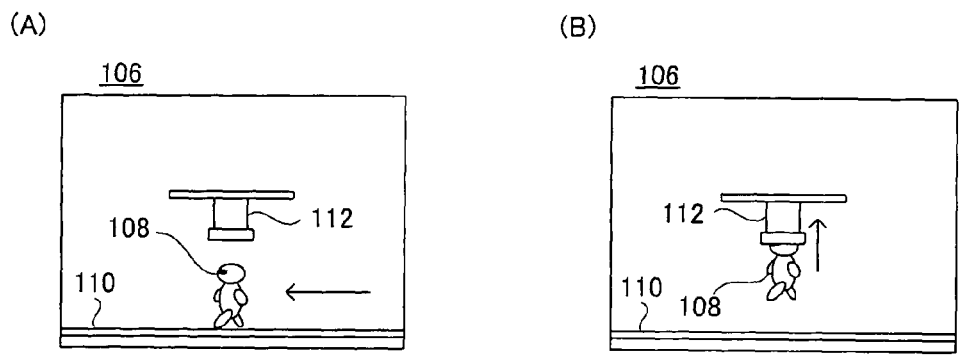
FIG. 15 is an illustrative view showing one example of an operating manner for the area switch in the scene yet to be switched, (A) shows a left-facing moving manner toward a predetermined position, and (B) shows a predetermined operation in the predetermined position.

In FIG. 15, similar to the above-described FIG. 9, the downward-facing drainpipe is arranged as the entrance 112 for switching the area. However, in this FIG. 15 (A), the player object 108 moves from the right side of the display screen 106, and reaches a lower portion of the entrance 112 in a left-facing posture. Then, as shown in FIG. 15 (B), the player object 108 jumps and enters the entrance 112, as a result of the player using the operating portion 32 so as to perform a predetermined operation. Thereby, the area is switched. In this area yet to be switched, the direction in which the player object 108 has been proceeding faces to the left, as understood from FIG. 15.

Figure 16:
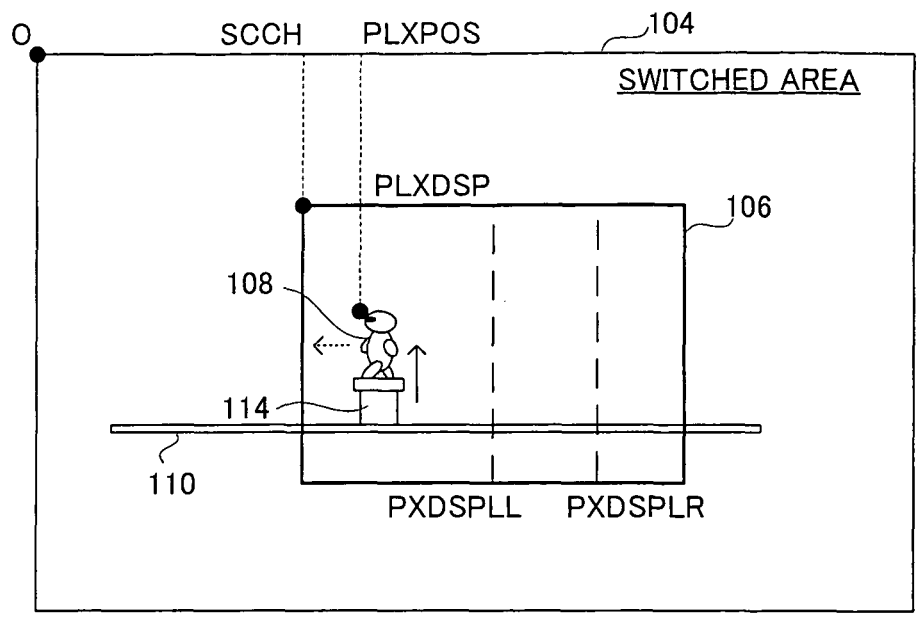
FIG. 16 is an illustrative view for describing the screen adjustment in the horizontal direction in a case that the direction in which to proceed in the switched scene faces to left, (A) shows a manner that the player object is arranged slightly left of the display screen, and (B) shows an adjusted display screen position in the horizontal direction.
Figure 16:
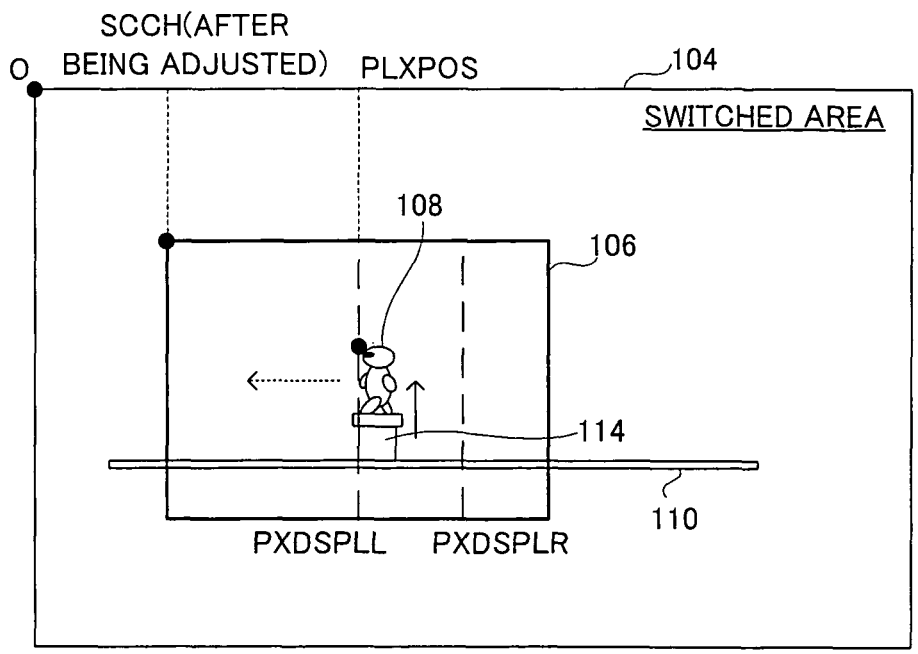

When the operation for switching the area is performed, as shown in FIG. 16 (A), the background image 104 of the switched area is generated, and the ground 110, the exit 114, etc., are arranged in a predetermined position. The player object 108 is arranged in a position in which the player object 108 has just come out of the drainpipe 114, based on the initial position. In addition, the display screen 106, is set based on the initial value. Furthermore, the exit 114 in the switched scene is the upward-facing drainpipe similar to the above-described FIG. 10, so that the direction in which to proceed of the player object 108 of the area yet to be switched, that is, the left-facing, is adopted as the horizontal direction in which the switched player object 108 is to proceed. Therefore, in this FIG. 16 (A), the parameters at a time of facing to left, that is, the X-coordinate right-side parameter PXDSPLR when the player faces to left and the X-coordinate left-side parameter PXDSPLL when the player faces to left, are set as the scroll controlling parameter for adjusting in the horizontal direction.

Then, in this FIG. 16 (A), the position of the exit 114, which is the area switching destination, and the initial position (after the forced movement) of the switched player object 108 are set in such a manner so as to be set to a slightly left edge portion in the display screen 106. Therefore, similar to the case of FIG. 11 (A), the display area of the direction in which the player object 108 is to proceed (indicated by a dotted arrow) is narrow, so that the adjustment of the screen display position is performed. More specifically, by the left edge check, using the X-coordinate left-side parameter PXDSPLL when the player faces to the left, it is determined whether or not display position X-coordinate PLXDSP of the player object 108 is smaller than PXDSPLL. As a result, when PLXDSP is smaller than PXDSPLL, a value of the screen display position X-coordinate SCCH is adjusted so that PLXDSP is rendered equal to PXDSPLL, or PLXDSP is located within the range of PXDSPLL and PXDSPLR as shown in FIG. 16 (B), for example. This makes it possible to render the display area of the side of the direction in which the player object 108 is to proceed (indicated by a dotted arrow) larger than it would be rendered in the initial position in FIG. 16 (A). Furthermore, after the area is switched, the display screen 106, on which the upward-facing drainpipe 114 and the player object 108 are adjusted to be in an approximately center, is displayed on the LCD 16. In this case, too, it is possible for the player to easily understand the direction in which to proceed, even when the area is switched. Furthermore, the switched area becomes easier to play.

It is preferable that PXDSPLL is set to the right side on the display screen 106 in order that the display area on the left side, which is the direction in which to proceed, is rendered as large as possible.

Figure 17:
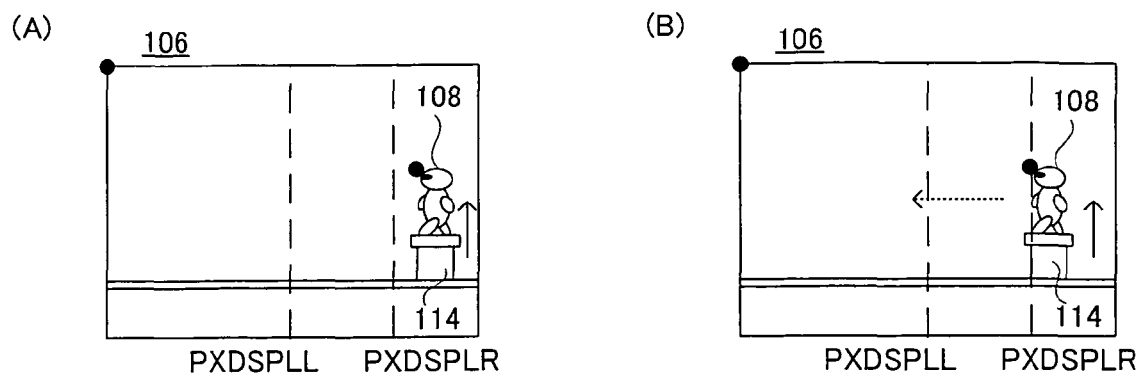
FIG. 17 is an illustrative view for describing a corrective screen adjustment in the horizontal direction in a case that the direction in which to proceed in the switched scene faces to left, (A) shows a manner that the player object is arranged slightly right of the display screen, and (B) shows the adjusted display screen.

Furthermore, as shown in FIG. 17 (A), when the exit 114, which is the area switching destination, and the initial position of the switched player object 108 are set to a slightly right edge portion on the display screen 106, the player object 108 is too close to the right edge, so that the player object 108 is difficult to see. Therefore, the screen display position is adjusted. More specifically, when the player display position X-coordinate PLXDSP is smaller than the X-coordinate left-side parameter PXDSPLR when the player faces to the left, the X-coordinate SCCH of the screen display position is adjusted in order that PLXDSP is equal to PXDSPLR, or PLXDSP enters the range of PXDSPLL and PXDSPLR as shown in FIG. 17 (B). In this case, too, the display area of the direction in which to proceed is displayed in a sufficiently large portion.

Figure 18:
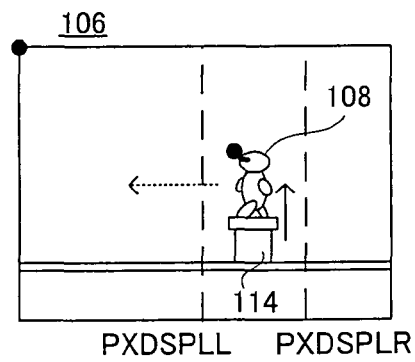
FIG. 18 is an illustrative view showing one example of a manner that the player object is arranged in an approximately center of the display screen in a case that the direction in which to proceed in the switched scene faces to left.

In addition, as shown in FIG. 18, when the exit 114, which is the area switching destination, and the initial position of the switched player object 108 are set within the range of PXDSPLL and PXDSPLR on the display screen 106, the display area of the direction in which to proceed is displayed largely enough that the adjustment of the screen display position is not necessarily needed.

Next, the screen position adjustment in the upward and downward directions will be described. In this illustrative embodiment, if the exit 114, which is the area switching destination, is an exit that has directionality in the upward and downward directions, such as the drainpipe in the upward and downward directions, etc., the screen position adjustment in the upward and downward directions is performed based on the direction in which to proceed, assuming that the directionality has a direction in which to proceed not only in the horizontal direction, but also in the upward and downward directions. That is, in a case of the upward-facing drainpipe, the player object 108 comes out above the inside of the drainpipe, so that it can be said that the direction in which to proceed is upward. On the other hand, in a case of the downward-facing drainpipe, the player object 108 comes out below the inside of the drainpipe, so that it can be said that the direction in which to proceed is downward.

Figure 19:
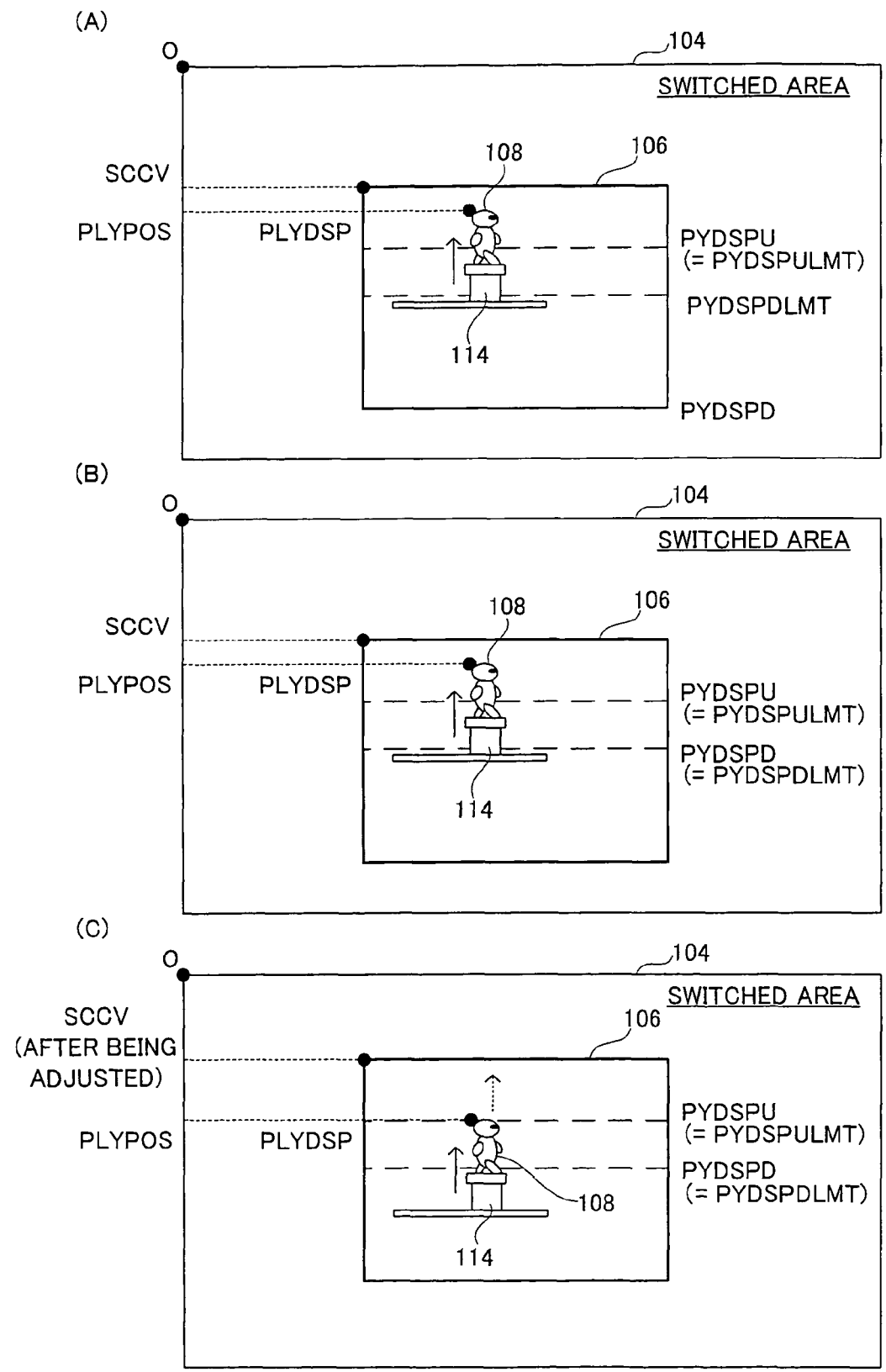
FIG. 19 is an illustrative view for describing a screen adjustment in the vertical direction in a case that an exit in the switched scene is an upward-facing drainpipe, (A) shows an initial manner that the player object is arranged in a slightly upper portion of the display screen, (B) shows a setting manner of a lower-side parameter, and (C) shows an adjusted display screen position toward an upper side.
Figure 20:
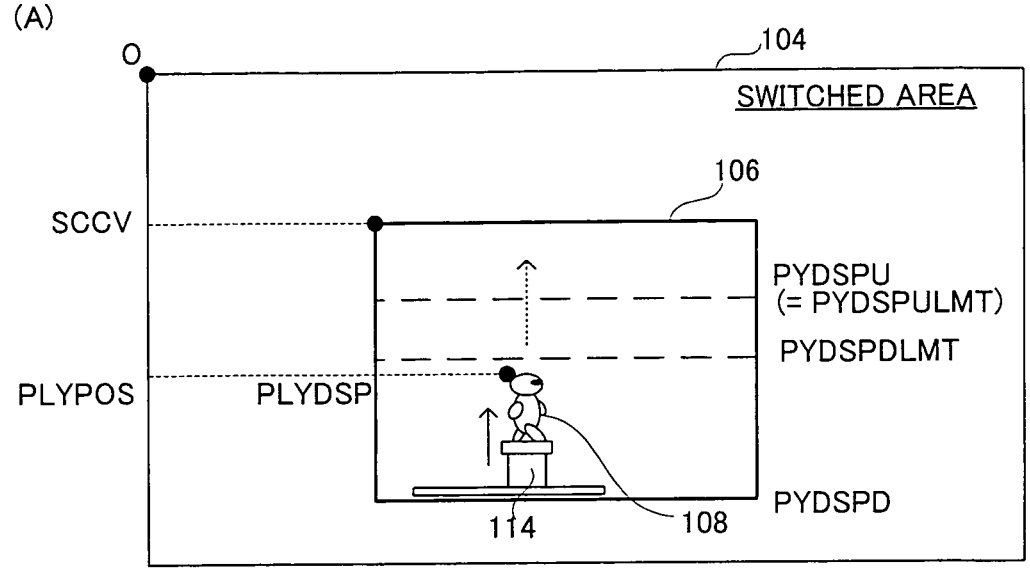
FIG. 20 is an illustrative view showing a manner that the player object is arranged in a slightly lower portion in a case that the exit in the switched scene is the upward-facing drainpipe, (A) shows an initial manner, and (B) shows the setting manner of the lower-side parameter.
Figure 20:
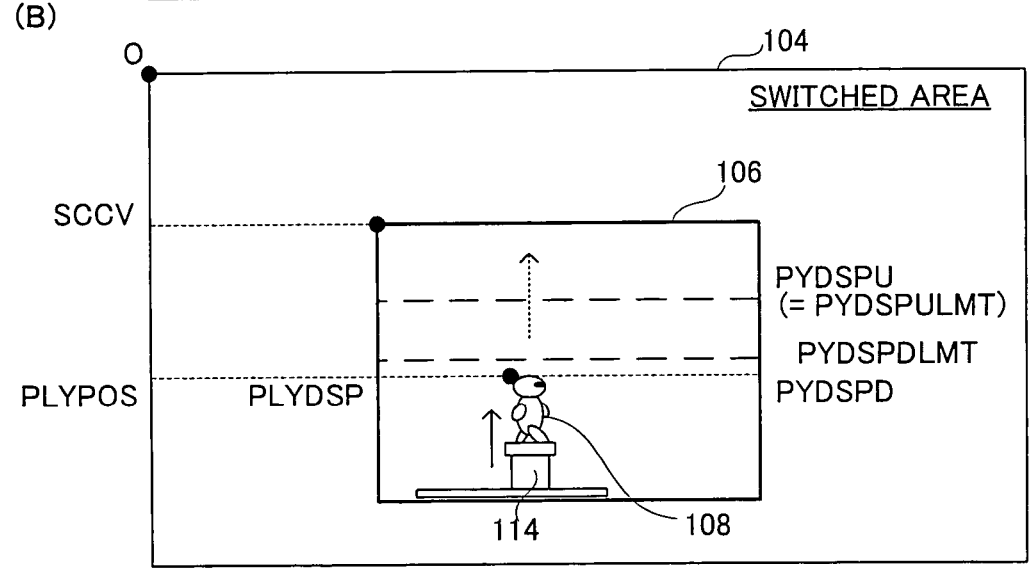
Figure 21:
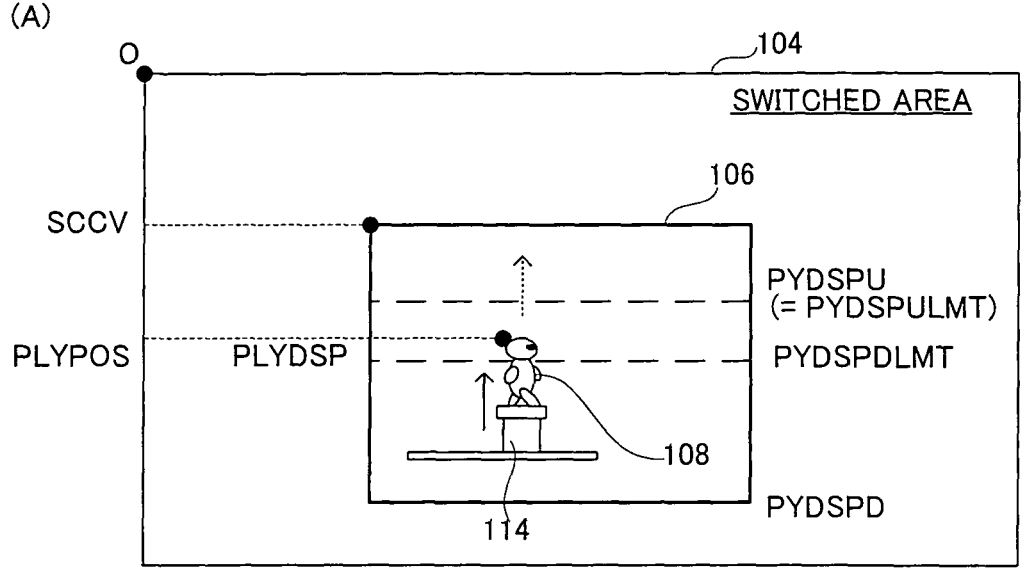
FIG. 21 is an illustrative view showing a manner that the player object is arranged in an approximately center in a case that the exit in the switched scene is the upward-facing drainpipe, (A) shows the initial manner, and (B) shows the setting manner of the lower-side parameter.
Figure 21:
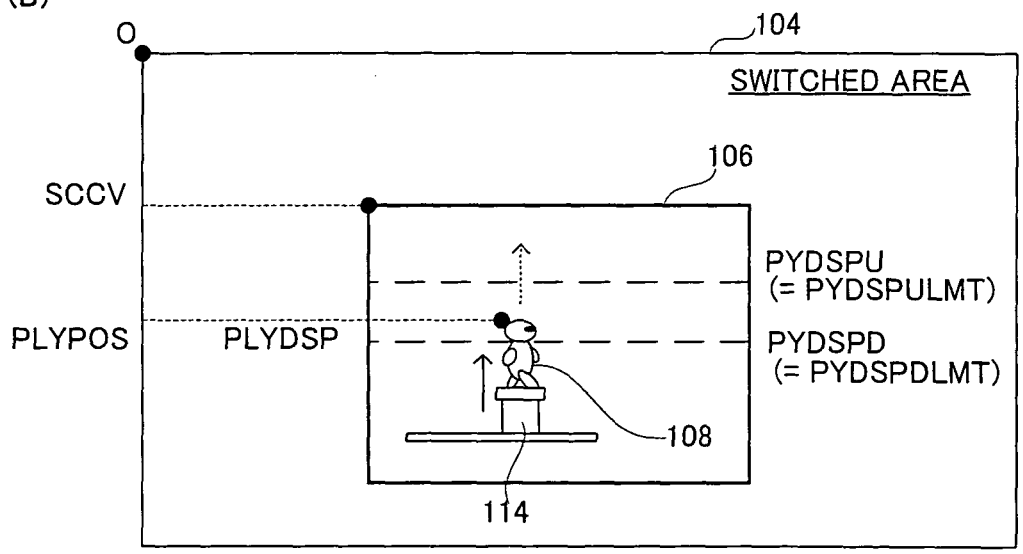

FIG. 19, FIG. 20, and FIG. 21, show one example of the adjustment of the upward and downward directions when the exit 114 in the switched scene is the upward-facing drainpipe. When the operation for switching the area is performed, as shown in FIG. 19 (A), the background image 104 of the switched area is generated, and the exit 114, etc., are arranged in the predetermined position. The player object 108 is in a position in which the player object 108 has just come out of the drainpipe 114 as described above. It is noted that in this FIG. 19, there is a case shown that the horizontal direction in which the player object 108 is to proceed faces to the right. However, the adjustment of the vertical direction does not rely on the horizontal direction.

The display screen 106 is set based on the initial value of the screen display position, and the player Y-coordinate upper-side parameter limit value PYDSPULMT and the player Y-coordinate lower-side parameter limit value, relative to this display screen 106, are set. In this FIG. 19 (A), the area switching destination is the upward-facing drainpipe, so that the player Y-coordinate lower-side parameter PYDSPD is set to the same position as a lower limit of the display screen 106 in the first place, and the Y-coordinate upper-side parameter PYDSPU is set to the same position as PYDSPULMT. Thereafter, PYDSPD is set to a lower value on the screen, out of either PYDSPDLMT or the player display position PLYDSP, which is forcedly moved.

In FIG. 19 (A), the initial position (after the forced movement) of the player object 108 is set to a slightly upper edge portion of the display screen 106, and PYDSPDLMT is lower than PLYDSP. Therefore, as shown in FIG. 19 (B), PYDSPD is set to the same position as PYDSPDLMT.

In addition, when thus arranged slightly to the upper edge portion, the display area on an upward direction side, which is the direction in which the player object 108 is to proceed, is narrow, so that if the switched display screen 106 is displayed as it is, so little information is shown on the upper direction side, that it is not possible for the player to understand the situation in the direction in which to proceed. Therefore, in such a case, the adjustment of the screen display position is executed. More specifically, it is determined, by the upper edge check using the player Y-coordinate upper-side parameter PYDSPU, whether or not the display position Y coordinate PLYDSP of the player object 108 is smaller than PYDSPU. As a result, when PLYDSP is smaller than PYDSPU, as shown in FIG. 19 (C), the screen display position Y-coordinate SCCV is adjusted so that PLYDSP is equal to PYDSPU, for example. This makes it possible to render the display area on the side of the direction in which the player object 108 is to proceed (indicated by a dotted arrow) larger than that of the rendering in the initial position of FIG. 19 (A). Therefore, if the area switching destination is the upward-facing drainpipe, the information on the direction in which to proceed side is increased, as a result of the screen display position being adjusted so as to be moved upward, thus making it easier to determine the operation to be performed next. This makes it easier to play the switched area.

It is noted that the adjusting position is not limited to the position of PYDSPU. It may be possible to adjust so that PLYDSP exits within the range of PYDSPU and PYDSPD, for example.

In addition, as shown in FIG. 20 (A), when the initial position of the player object 108 of the switched area is set to a slightly lower edge portion of the display screen 106, and the display position PLYDSP of the player, which is forcedly moved, is located in a lower side than PYDSPDLMT, the display area on the upper side, which is the direction in which the player object 108 is to proceed, is largely displayed. Therefore, in this case, the screen adjustment of the upward and downward directions is not performed in this illustrative embodiment. Because of this, PYDSPD is set to the same position as the display position Y coordinate PLYDSP, after the forced movement of the player object 108, so that the adjustment is not performed by the lower edge check by PYDSPD as shown in FIG. 20 (B).

In addition, as shown in FIG. 21 (A), when the initial position of the player object 108 of the switched area is set to an approximate center, and the player display position PLYDSP, after the forced movement, exists within the range of PYDSPULMT and PYDSPDLMT, the display area on the side of the direction in which to proceed is displayed so largely that the adjustment of the screen display position is not necessarily needed. It is noted that in this case PYDSPDLMT is on a lower side than PLYDSP so that PYDSPD is set to the same position as PYDSPDLMT as shown in FIG. 21 (B).

Figure 22:
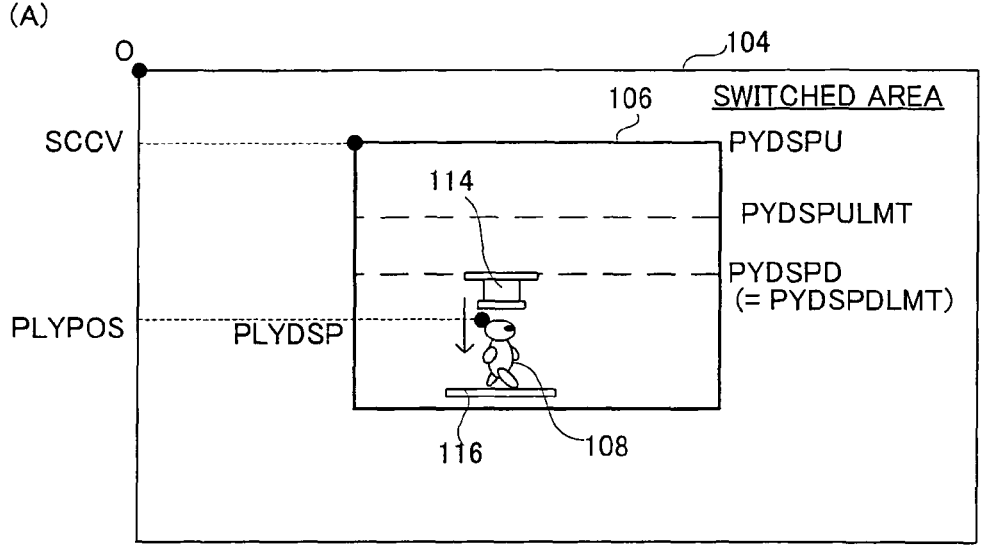
FIG. 22 is an illustrative view for describing the screen adjustment in the vertical direction in a case that the exit in the switched scene is a downward-facing drainpipe, (A) shows an initial manner that the player object is arranged in a slightly lower portion of the display screen, (B) shows the setting manner of an upper-side parameter, and (C) shows the adjusted display screen position toward a lower side.
Figure 22:
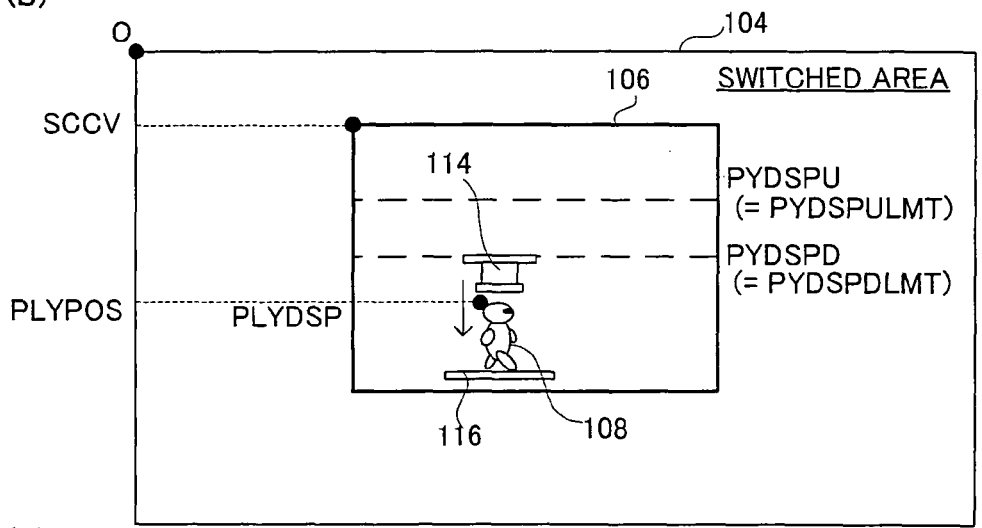
Figure 22:
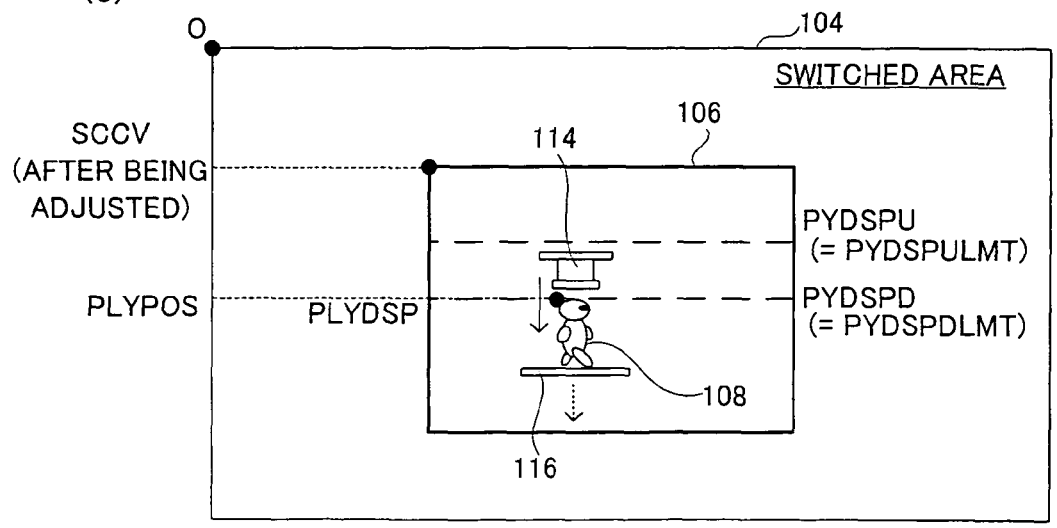
Figure 23:
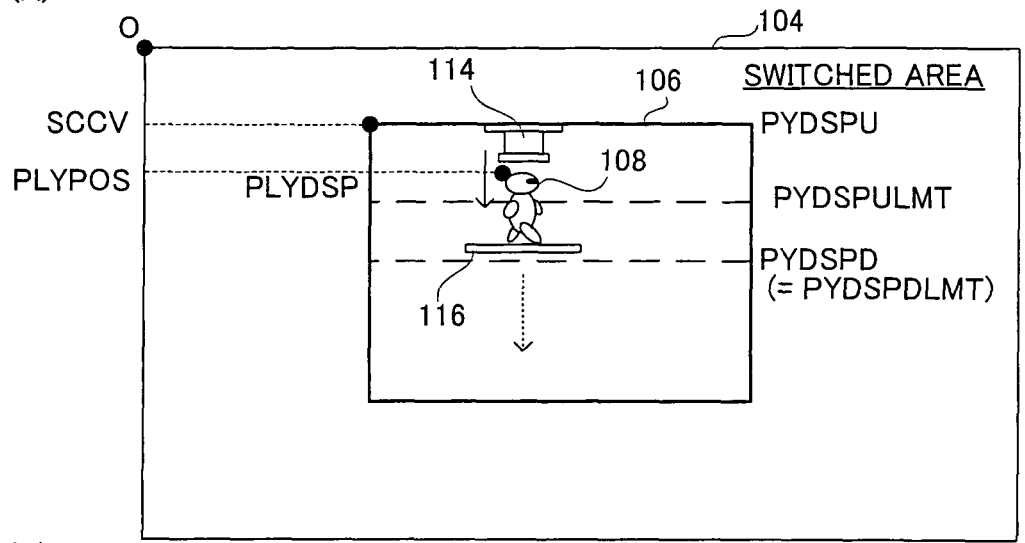
FIG. 23 is an illustrative view showing a manner that the player object is arranged in a slightly upper portion in a case that the exit in the switched scene is a downward-facing drainpipe, (A) shows the initial manner, and (B) shows the setting manner of the upper-side parameter.
Figure 23:
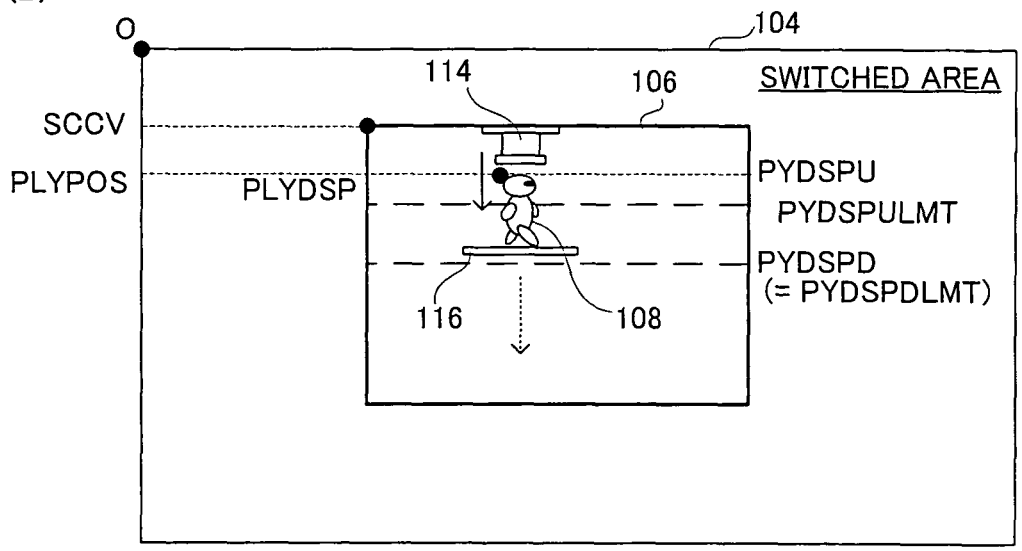
Figure 24:
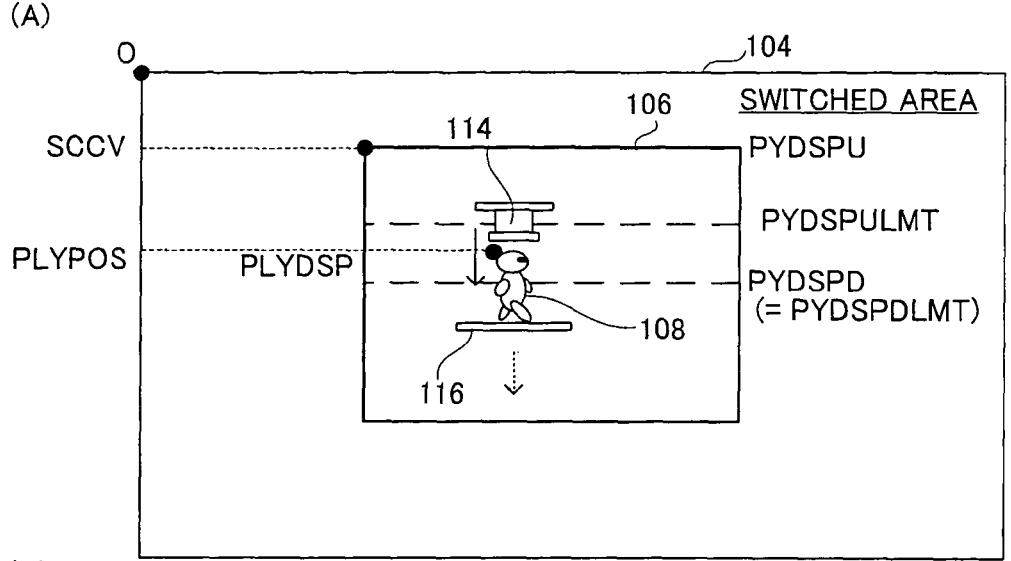
FIG. 24 is an illustrative view showing a manner that the player object is arranged in an approximately center in a case that the exit in the switched scene is the downward-facing drainpipe, (A) shows the initial manner, and (B) shows the setting manner of the upper-side parameter.
Figure 24:
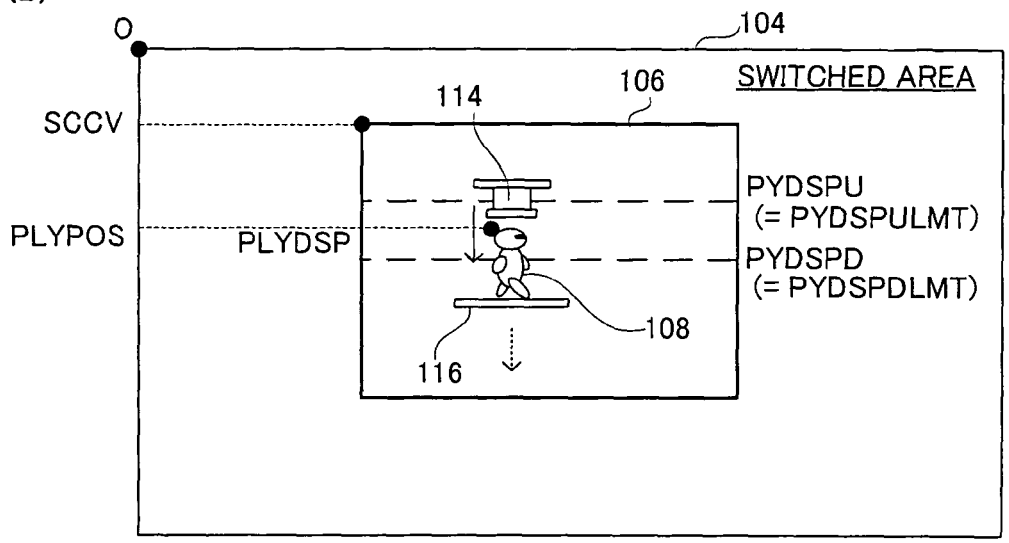

FIG. 22, FIG. 23, and FIG. 24 show one example of the adjustment of the upward and downward directions when the exit 114 in the switched scene is the downward-facing drainpipe. Below the downward-facing drainpipe 114, a foothold 116 is arranged, on which the player object 108, that has just come out, lands.

In a case that the area switching destination is the downward-facing drainpipe, as shown in FIG. 22 (A), the player Y-coordinate upper-side parameter PYDSPU is set to the same position as an upper limit of the display screen 106 in the first place, and player Y-coordinate lower-side parameter PYDSPD is set to the same position as PYDSPDLMT. Thereafter, PYDSPU is set to an upper value on the screen, out of PYDSPULMT and the player display position PLYDSP, after the forced movement.

In this FIG. 22 (A), the initial position (after the forced movement) of the player object 108 is set to a slightly lower edge portion of the display screen 106, and PYDSPULMT is in an area above PLYDSP. Therefore, as shown in FIG. 22 (B), PYDSPU is set to the same position as PYDSPULMT.

If thus arranged slightly to the lower edge portion, the display area on the lower direction side, which is the direction in which the player object 108 proceeds, is narrow, so that the adjustment of the screen display position is executed. More specifically, it is determined by the lower edge check, using the player Y-coordinate lower-side parameter PYDSPD, whether or not the display position Y coordinate PLYDSP of the player object 108 is larger than PYDSPD. As a result, in a case, for example, that PLYDSP is larger than PYDSPD, as shown in FIG. 22 (C), a value of screen display position Y-coordinate SCCV is adjusted in order that PLYDSP is rendered equal to PYDSPD. This makes it possible to render the display area in direction in which to proceed (indicated by a dotted arrow) of the player object 108 larger than that shown in the initial position of FIG. 22 (A). Therefore, if the area switching destination is the downward-facing drainpipe, the information on the direction in which to proceed side is increased, as a result of the screen display position being adjusted so as to be moved downward, making it easy to determine the operation to be performed next. This makes it easy to play the new, switched area.

The adjusting position is not limited to the position of PYDSPD. It may be possible to adjust in such a manner that PLYDSP exits within the range of PYDSPU and PYDSPD, for example.

In addition, as shown in FIG. 23 (A), if the initial position of the player object 108 of the switched area is set to a slightly upper edge portion of the display screen 106, and the display position PLYDSP of the player, which is forcedly moved, is located in an upper side than PYDSPULMT, the display area on the lower side, which is the direction in which the player object 108 proceeds, is largely secured. Therefore, in this case, the screen adjustment of the upward and downward directions is not performed in this embodiment. Due to this, PYDSPU is set to the same position as the display position Y coordinate PLYDSP, after the forced movement of the player object 108, so that the adjustment is not performed by the upper edge check by PYDSPD, as shown in FIG. 23 (B).

In addition, as shown in FIG. 24 (A), in a case that the initial position of the player object 108 of the switched area is set approximately to the center, and the player display position PLYDSP, after the forced movement, exists within the range of PYDSPULMT and PYDSPDLMT, the display area on the direction in which to proceed side is provided in great enough quantity that the adjustment of the screen display position is not performed. It is noted that in this case, PYDSPULMT is in a lower side than PLYDSP so that PYDSPU is set to the same position as PYDSPULMT, as shown in FIG. 24 (B).

It is noted that in the case above, the exit 114 of the area switching destination is the drainpipe of the upward and downward directions, and the direction in which to proceed horizontally in the switched area are determined by the direction in which the player object 108 has been proceeding in the area yet to be switched. However, the exit 114 may be an exit having directionality in the horizontal direction, such as the drainpipe in the horizontal direction, etc. In this case, the direction in which the player object 108 is to proceed in the switched area is determined by the direction of the exit 114, irrespective of the direction in which the player object 108 has been proceeding in the area yet to be switched.

Figure 25:
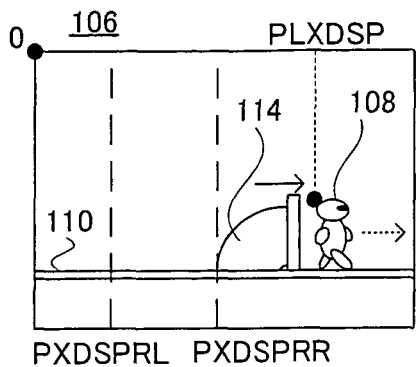
FIG. 25 is an illustrative view showing a parameter for the screen adjustment in the horizontal direction in a case that the exit in the switched scene is the right-facing drainpipe.

More specifically, in a case that the exit 114 is an exit that faces to right, such as the right-facing drainpipe, etc., the player object 108 comes out facing to the right after the area is switched, as shown in FIG. 25, so that the direction in which is proceeds is to the right. Therefore, the adjustment of the horizontal direction of the screen position is performed based on the parameters PXDSPRR and PXDSPRL when the player faces to right, similar to the cases of the above-described FIG. 11, FIG. 13, and FIG. 14. In an example of this, FIG. 25, the display position PLXDSP of the player object 108 is larger than PXDSPRR, so that the screen position of the display screen 106 is adjusted so that as much of the display area as is possible is shown, in the direction in which to proceed.

Figure 26:
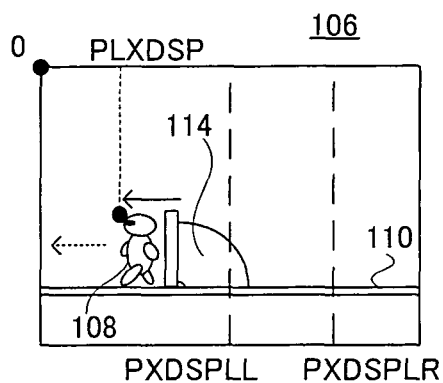
FIG. 26 is an illustrative view showing a parameter for the screen adjustment in the horizontal direction in a case that the exit in the switched scene is the left-facing drainpipe.

In addition, if the exit 114 is a left-facing exit, such as the left-facing drainpipe, etc., the player object 108 comes out by facing to the left after the area is switched, as shown in FIG. 26, so that the direction in which the object proceeds is to the left. Therefore, the adjustment of the horizontal direction of the screen position is performed based on the parameters PXDSPLL and PXDSPLR when the player faces to left, similar to the cases of the above-described FIG. 16, FIG. 17, and FIG. 18. In an example of this, FIG. 26, display position PLXDSP of the player object 108 is smaller than PXDSPLL, so that the screen position of the display screen 106 is adjusted so that the display area in the direction in which to proceed is rendered as large as possible.

Figure 27:
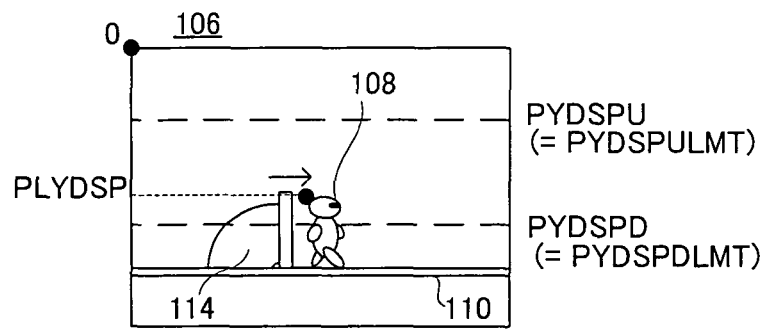
FIG. 27 is an illustrative view showing a parameter for the corrective adjustment in the vertical direction in a case that the exit in the switched scene is the right-facing drainpipe.

In a case that the exit 114 is an exit having horizontal directionality, as shown in FIG. 27, each of the parameters PYDSPU and PYDSPD, for the upward and downward screen adjustment, is set to the same position as PYDSPULMT and PYDSPDLMT. In this case, there is no directionality in the upward and downward directions, so that this upward and downward screen adjustment is not made to affect the display area of the direction in which to proceed. That is, this is merely for making a correction if the initial position of the player object 108 is too close to the upper and lower edge portions of the display screen 106.

Furthermore, in the above, the exit 114 of the area switching destination is an exit having vertical or horizontal directionality. However, a doorway (exit or entrance, or both) for switching the area may not have directionality. In this case, the direction in which the player object 108 proceeds, in the switched scene, is determined by the direction in which the player object 108, yet to be switched, has been proceeding.

Figure 28:
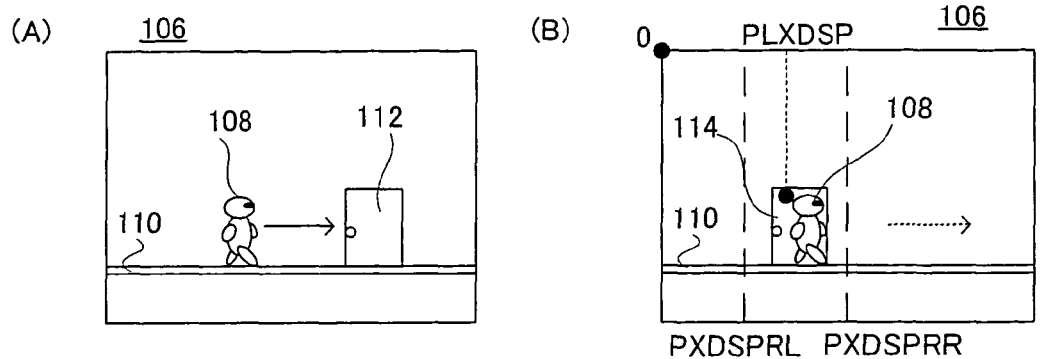
FIG. 28 is an illustrative view for describing the screen adjustment in the horizontal direction in a case that the switching destination is a door having no directionality, (A) shows a manner that the right-facing player object yet to be switched moves toward an entrance, (B) is an illustrative view showing the parameter for the switched screen adjustment in horizontal direction.

That is, in a case that a door having no directionality is arranged as the entrance 112, as shown in FIG. 28 (A) for example, when the player object 108 reaches the position of this door 112 from the left side, the direction in which to proceed faces to the right. As shown in FIG. 28 (B), the exit 114 of the switching destination is also a door having no directionality, so that the direction in which to proceed in the switched scene is set to the right, which is the direction in which the object proceeds in the scene yet to be switched. In addition, the adjustment of the horizontal direction of the screen position is performed based on parameters PXDSPRR and PXDSPRL when the player faces to the right.

Figure 29:
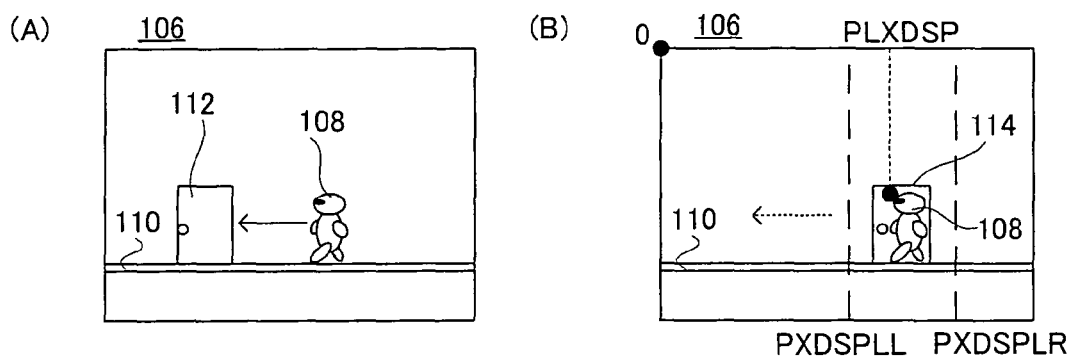
FIG. 29 is an illustrative view for describing the screen adjustment in the horizontal direction in a case that the switching destination is the door having no directionality, (A) shows a manner that the left-facing player object yet to be switched moves toward the entrance, (B) is an illustrative view showing the parameter for the switched screen adjustment in horizontal direction.

In addition, as shown in FIG. 29 (A), when the player object 108 reaches the door 112 from the right side, the direction in which to proceed is to the left. Therefore, the direction in which to proceed in the switched scene is set to the left, and as shown in FIG. 29 (B), the adjustment of the horizontal direction of the screen position is performed based on the parameters PXDSPLL and PXDSPLR when the player faces to left.

Figure 30:
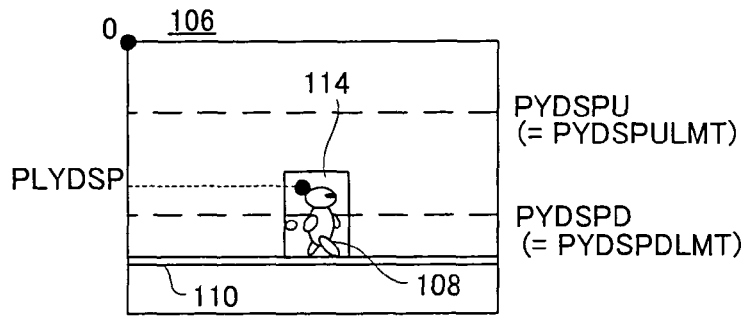
FIG. 30 is an illustrative view showing a parameter for the corrective adjustment in the vertical direction in a case that the switching destination is the door having no directionality.

As shown in FIG. 30, if this doorway has no directionality, each of the parameters PYDSPU and PYDSPD, for the upward and downward screen adjustment, is set to the same position as PYDSPULMT and PYDSPDLMT, similar to FIG. 27. Although the adjustment is not made to alter the display area of the direction in which to proceed, the adjustment is performed in a corrective sense.

Figure 31:
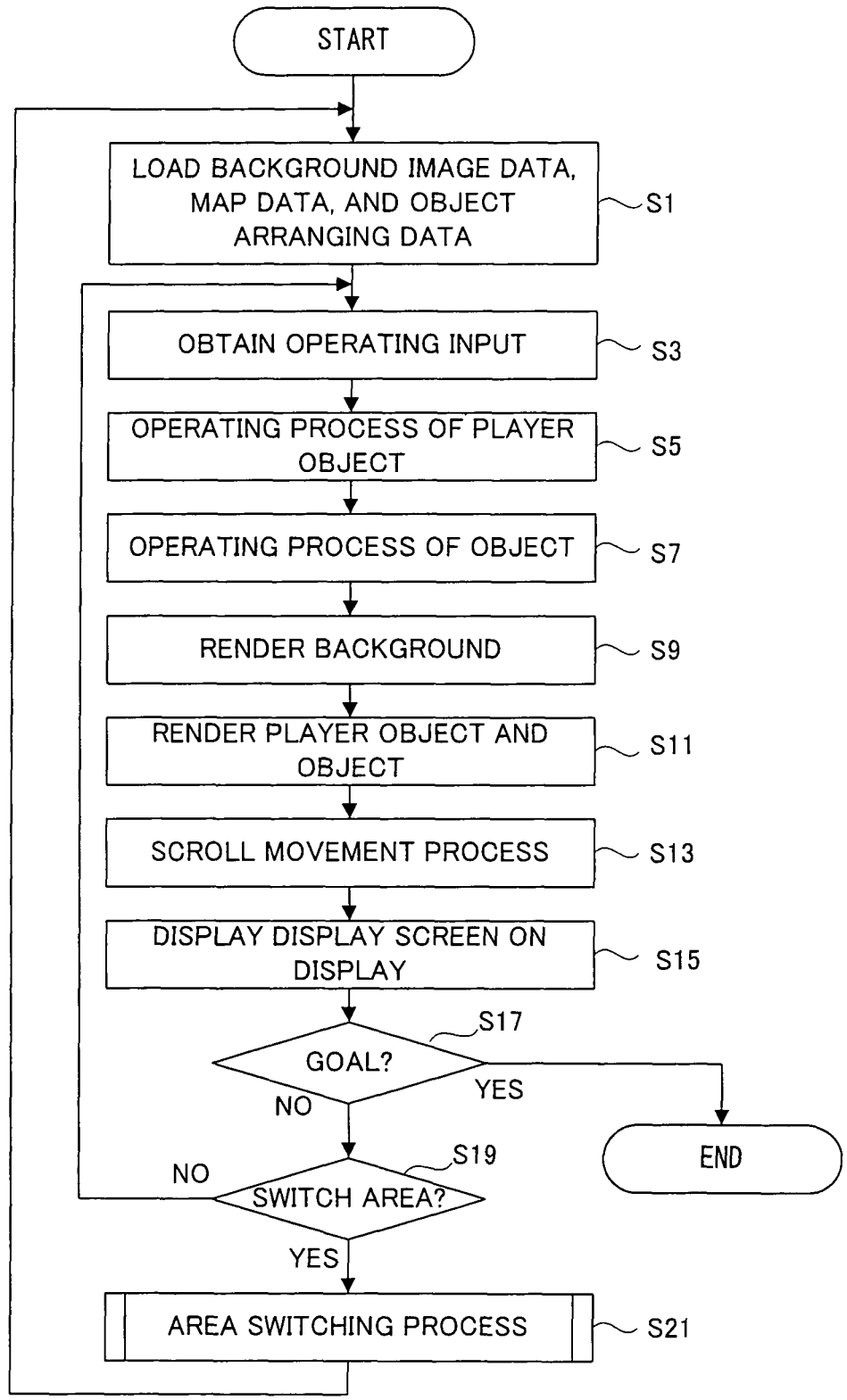
FIG. 31 is a flowchart showing one example of a game operation in the FIG. 1 embodiment.

In FIG. 31, one example of a series of game operations of this game device 10 is shown. When power is input to the game machine 12, to which the cartridge 14 is attached, a necessary program and data are read out from the ROM 52 of the cartridge 14 and loaded (stored) into the working memory 48. As a result, the CPU 40 starts a process. Then, the player instructs the game to start, through the operation input of the operating portion 32. In a first step S1 of FIG. 31, the CPU 40 reads the background image data 80, the map data 82, and the object arranging data necessary for each scene (also referred to as a course, a stage, or an area), out from the ROM 52, and loads them into the data storing area 90 of the work area 48. This allows the background and the player object, another object, such as the enemy object, the geography object, etc., to be arranged in each initial position in each scene, and an initial setting of the data regarding each object and other processes are performed.

Next, the CPU 40 obtains the operation input signal from the operating portion 32 in a step S3. It may not be possible to receive the operation input, skipping this process of the step S3, if an initial image is being displayed at a time of starting the game, the game is switching the area, and so forth.

In a succeeding step S5, the CPU 40 executes an operating process of the player object. That is, the player object 108 is made to operate corresponding to the operation input signal (if the operation input is obtained in the preceding step S3) and the program. If the player operates the cross button 18 of the operating portion 32, the CPU 40 makes the player object 108 face the direction in which to proceed, corresponding to the operation input, and move in that direction in the game world. The CPU updates the player object position data 94 to a moved position coordinates in this step S5. In addition, if the A button 24 is operated, for example, the CPU 40 makes the player object 108 jump, for example, in this step S5. Furthermore, actions, such as coming out of the drainpipe, etc., are also processed in this step S5.

In a succeeding step S7, the CPU 40 executes an operating process of the object. In this process, the CPU 40 allows the objects (enemy object, etc.) other than the player object 108 to operate corresponding to the operation input signal and the program.

In a succeeding step S9, the CPU 40 renders the background image in a predetermined area of a VRAM (not shown), based on the background image data 80, the map data 82, etc. In addition, in a step S11, the CPU 40 renders, into a predetermined area, images of the player object 108, another object, etc., that reflect the operation by the step S5 and the step S7 based on the object image data 78, including the player object image data 78a, etc.

In a step S13, the CPU 40 executes a scroll movement process. By the scroll movement process, the screen display position of the display screen is, as required, adjusted based on the position of the player object 108. If the player object 108 is too close to an edge of the display screen 106, etc., for example, the screen display position data 92 is updated so that the display screen 106 is moved in conjunction with the movement, as required.

In a succeeding step S15, the CPU 40 allows the display screen 106 to be displayed on the display 16. More specifically, the CPU 40 composes the background image 104 and images of various objects, generates, into a frame area of the VRAM (not shown), the image data that exists in the display range, that is, the image data of the display screen 106, based on the screen display position data 92, for example, applies the image data (displayed data) to the LCD 16, and allows the display screen 106 to be displayed on the LCD 16 using an LCD controller (not shown).

In a step S17, the CPU 40 determines whether or not the player object 108 reaches a goal of the course or the scene, and if "YES", the CPU 40 ends the game process of the course or scene.

On the other hand, if "NO" in the step S17, that is, if the player object 108 has not reached the goal, the CPU 40 determines whether or not to switch the area, in a succeeding step S19. More specifically, it is determined whether or not the player object 108 exists in the predetermined position for switching the area, whether or not there is a predetermined operation toward the entrance 112 for switching the area, and so forth. If the switching area is the downward-facing drainpipe 112, as shown in FIG. 9 for example, it is determined whether or not the player object 108 is moved to a predetermined position below the drainpipe 112, and whether or not there has been an operation instructing the player object 108 to jump. If the switching area is the door 112, as shown in FIG. 28 (A) for example, it is determined whether or not there the operation has been performed to move the player object 108 to the position of the door. If "NO" in this step S19, the process returns to the step S3, so as to repeat the game process of the course or the scene.

On the other hand, if "YES" in the step S19, that is, if the operation for switching the area has occurred, the CPU 40 processes the area switch in a succeeding step S21. By this area switching process, the direction in which the player object 108 is to proceed in the switched scene is detected, and the screen display position of the display screen 106 is adjusted corresponding to the direction in which to proceed. Details of this area switching process of this step S21 are shown from FIG. 32 to FIG. 36.

Figure 32:
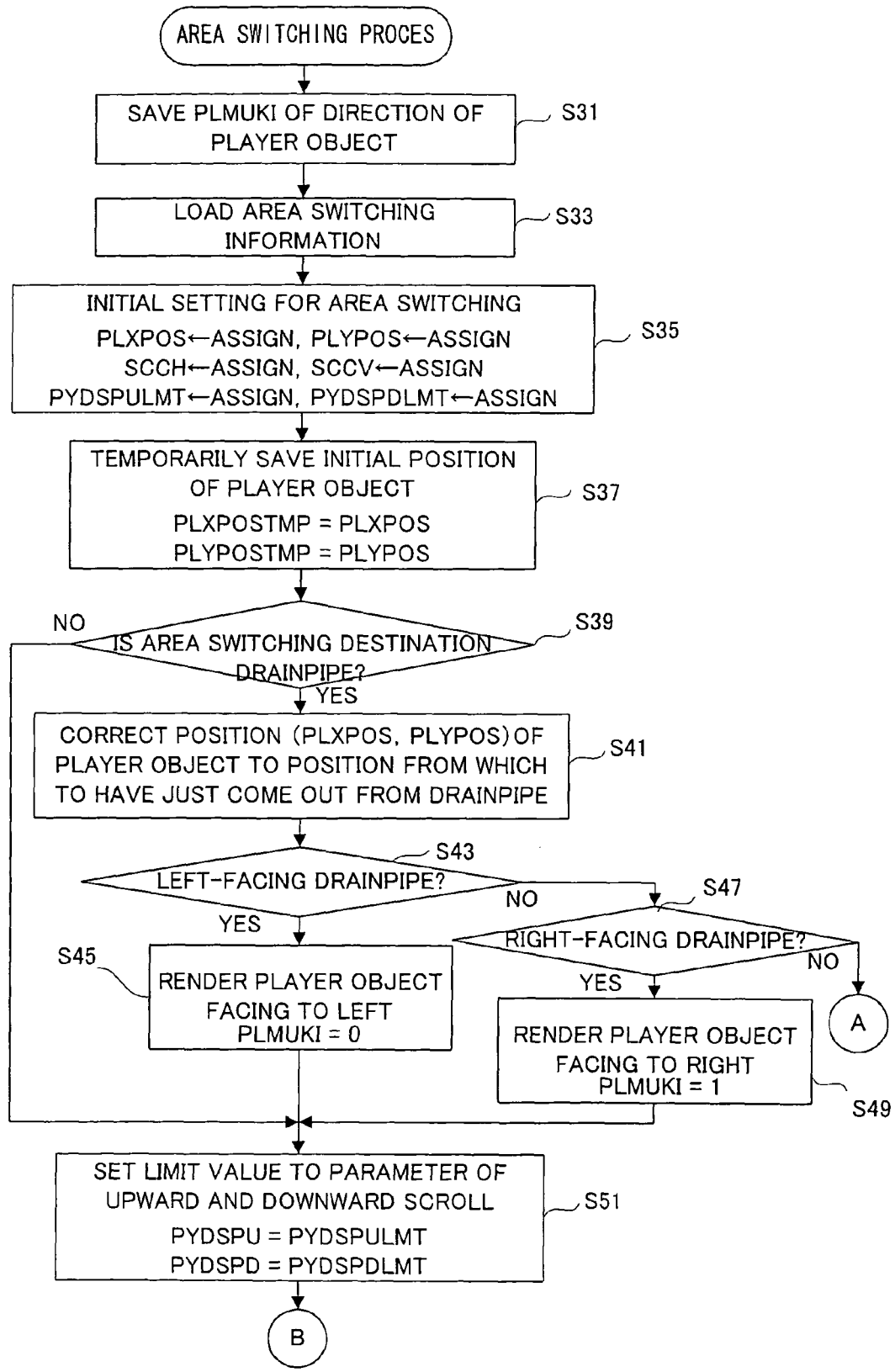
FIG. 32 is a flowchart showing one portion of one example of an area switching process in FIG. 31.

In a first step S31 in FIG. 32, the CPU 40 saves (stores) direction PLMUKI of the player object 108 into a player object direction data area 96 when the area switching operation occurs. When facing to left, "0" is set to PLMUKI, and when facing to right, "1" is set to PLMUKI.

Next, in a step S33, the CPU 40 loads area switching information of the switched scene from another data area 86 of the ROM 52, and in a succeeding step S35, an initial setting for switching the area is processed. The area switching information includes initial position data 94 of the player object 108 in the switched scene, screen initial display position data 92 of the display screen 106, parameter limit values for adjusting the upward and downward directions of the screen display position, etc. Based on this area switching information, the initial values of each variable necessary for the area switch are set. Each data is assigned to an X-coordinate PLXPOS of the player object, a Y-coordinate PLYPOS of the player object, the screen display position X-coordinate SCCH, a screen display position Y-coordinate SCCV, a player Y-coordinate upper-side parameter limit value PYDSPULMT, and a Y-coordinate lower-side parameter limit value PYDSPDLMT, for example. In this step S35, each data is further assigned to an X-coordinate left-side parameter PXDSPLL when the player faces to left and an X-coordinate right-side parameter PXDSPLR when the player faces to left, or an X-coordinate right-side parameter PXDSPRR when the player faces to right and an X-coordinate left-side parameter PXDSPRL when the player faces to right, a scroll left limit value LLIMIT, a scroll right limit value RLIMIT, a scroll upper limit value ULIMIT, a scroll lower limit value DLIMIT, etc.

Next, in a succeeding step S37, the CPU 40 temporarily saves the initial position of the player object 108. More specifically, data of PLXPOS is set to the player X-coordinate temporary save PLXPOSTMP, and data of PLYPOS is set to the player Y coordinate temporary save PLYPOSTMP. If the position of the player object 108 is forcedly moved after the area is switched, like the doorway of the drainpipe shown in FIG. 10, etc., for example, the adjustment of the screen position is performed based on the position after the forced movement of the player object 108, so that the initial position before the forced movement is herein saved in another variable area.

Then, in a step S39, the CPU 40 determines whether or not the area switching destination, which is the exit 114, has the directionality, such as the drainpipe, etc. If "YES" in this step S39, the CPU 40 corrects the position (PLXPOS, PLYPOS) of the player object, to the position in which the player object has just come out, in a succeeding step S41. This makes it possible to perform the adjustment of the screen position based on the position after the forced movement, as described above.

Subsequently, in a step S43, the CPU 40 determines whether or not the exit 114 is the left-facing drainpipe 114 as shown in FIG. 26, and if "YES", the CPU 40 sets "0" to PLMUKI in a succeeding step S45, that is, the CPU 40 sets the direction of the player object 108 to the left. On the other hand, if "NO" in the step S43, the CPU 40 determines whether or not the exit 114 is the right-facing drainpipe as shown in FIG. 25 in a step S47, and if "YES", the CPU 40 sets "1" to PLMUKI in a succeeding step S49, that is, the CPU 40 sets the direction of the player object 108 to the right. It is noted that if "NO" in the step S47, the process advances to a step S53 in FIG. 33.

On the other hand, if "NO" in the step S39, that is, in a case that the exit 114 is not the drainpipe as shown in FIG. 28, etc., the process advances to a step S51. In addition, upon completion of the step S45 and the step S49, the process advances to the step S51.

In the step S51, the CPU 40 sets each limit value to the parameters for scrolling upward and downward, as shown in FIG. 27 and FIG. 30. That is, PYDSPULMT is assigned to a player Y-coordinate upper-side parameter PYDSPU, and PYUDSPDLMT is assigned to a player Y-coordinate lower-side parameter PYDSPD. Upon completion of the process of the step S51, the process advances to a step S59 in FIG. 33.

Figure 33:
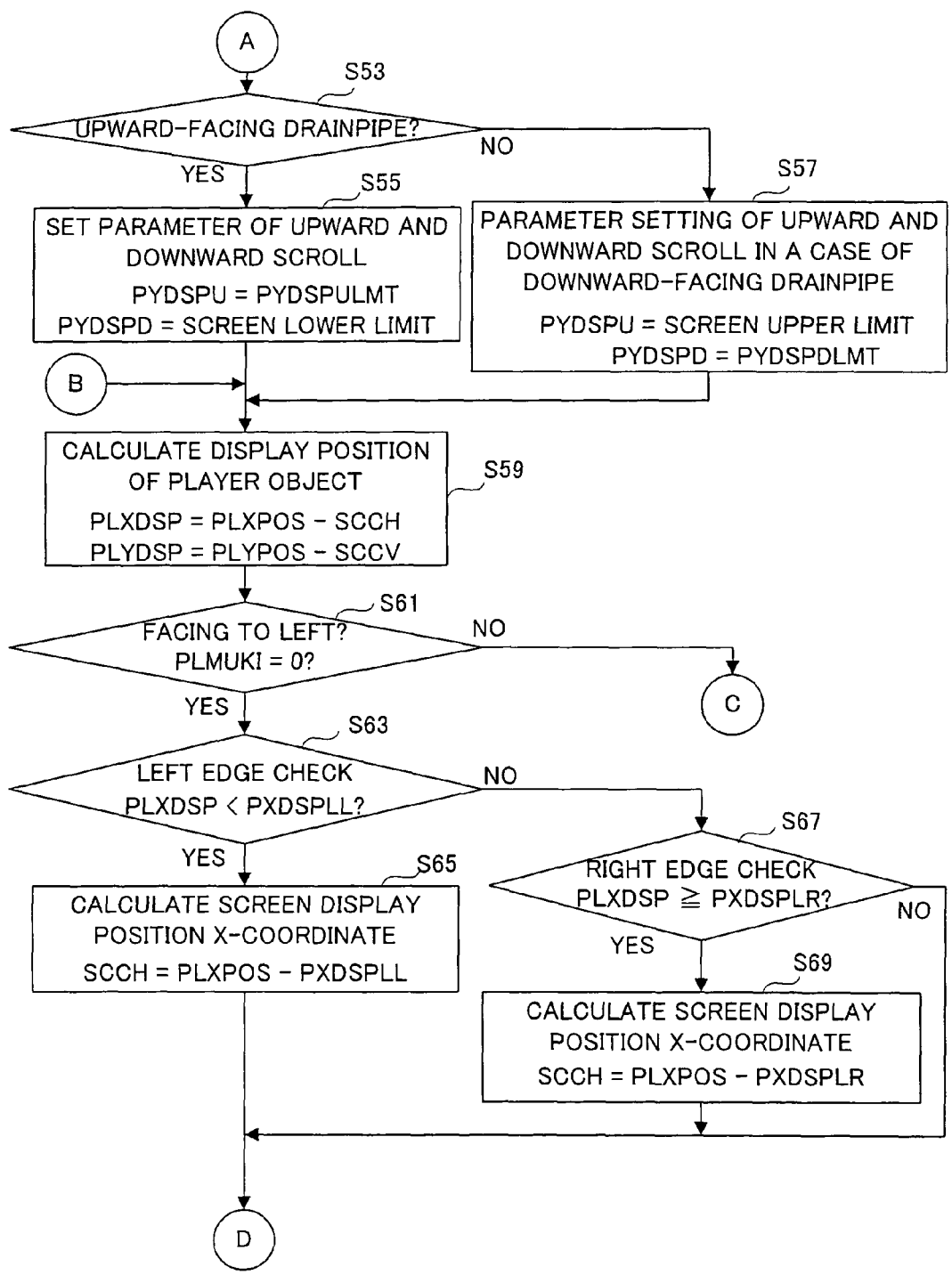
FIG. 33 is a flowchart showing one portion continued from FIG. 32.

In the step S53 of FIG. 33, the CPU 40 determines whether or not the exit 114 is the upper-looking drainpipe as shown in FIG. 11, etc., if "YES", the CPU 40 sets the parameter for scrolling upward and downward to the value associated with a case of an upward-facing drainpipe. That is, as shown in FIG. 19 (A), FIG. 20 (A), and FIG. 21 (A), PYDSPULMT is assigned to PYDSPU, and a screen lower-limit position is assigned to PYDSPD.

On the other hand, if "NO" in the step S53, that is, in a case that the exit 114 is the downward-facing drainpipe as shown in FIG. 22, etc., the CPU 40 sets the parameter for the upward and downward scrolling to the value associated with a case of a downward-facing drainpipe, in a succeeding step S57. That is, as shown in FIG. 22 (A), FIG. 23 (A), and FIG. 24 (A), the CPU 40 assigns a screen upper-limit position to PYDSPU, and assigns PYDSPDLMT to PYDSPD. Upon completion of the step operations indicated in block S55 or the step S57, the process advances to the step S59.

In the step S59, the CPU 40 calculates the display position coordinates (PLXDSP, PLYDSP) of the player object 108 on the display screen 106. The display position coordinates are calculated according to a following equation: PLXDSP=PLXPOS−SCCH. PLYDSP=PLXPOS−SCCV.

Figure 34:
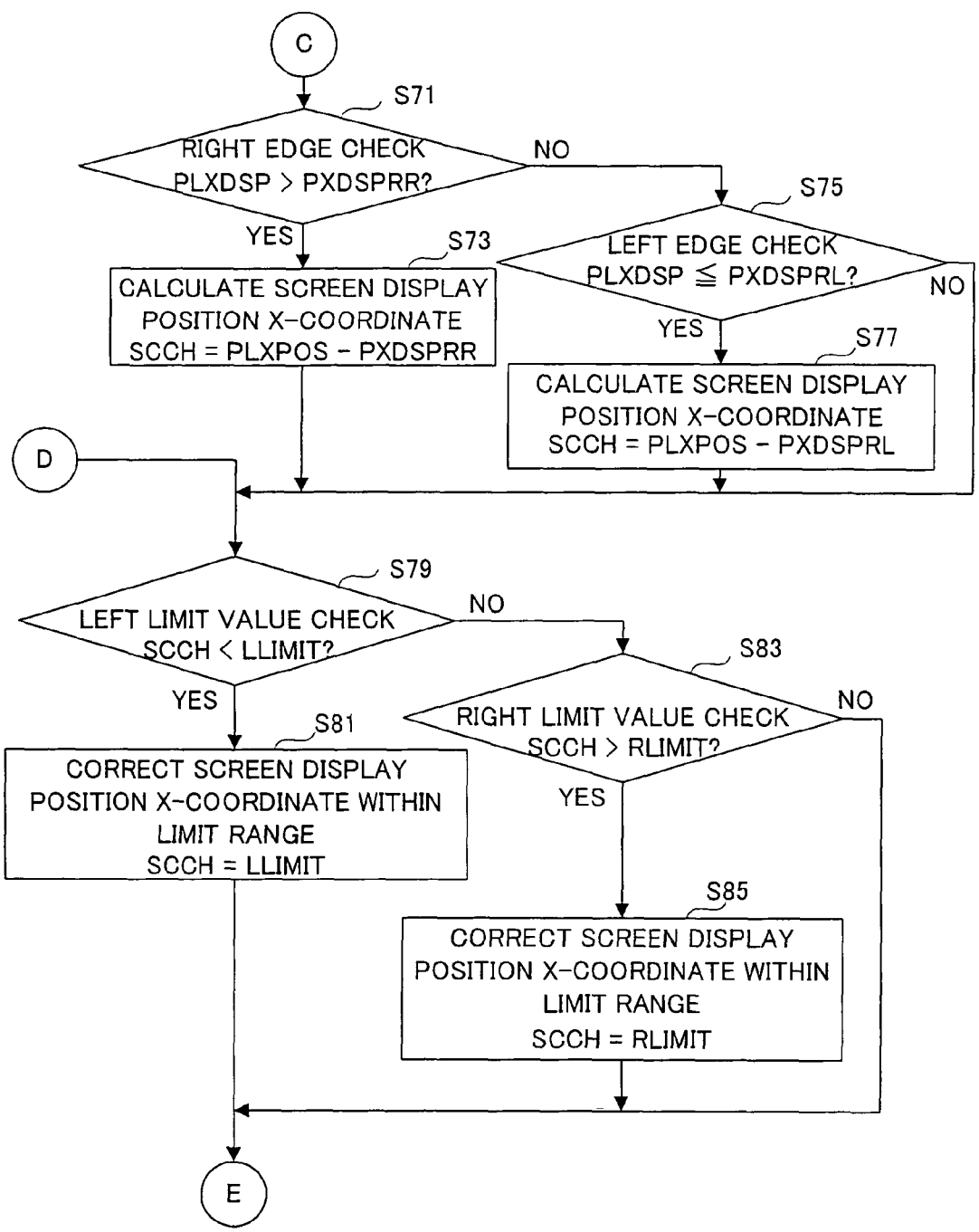
FIG. 34 is a flowchart showing one portion continued from FIG. 33.

Then, as a result of processes from a succeeding step S61 to a step S69, and from a step S71 to a step S77 in FIG. 34, the screen position adjustment of the horizontal direction is performed based on the direction in which to proceed of the player object 108 of the switched area.

In the step S61, the CPU 40 determines whether or not the direction in which to proceed faces to the left, that is, whether or not "0" is set to PLMUKI. If "YES" in the step S61, the CPU 40 performs a left edge check, so as to determine whether or not PLXDSP is less than PXDSPLL, in a succeeding step S63, as shown in FIG. 16 (A). If "YES" in this step S63, the CPU 40 calculates the screen display position X-coordinate, based on the position coordinates of the player object 108 and the parameter when facing to the left. The screen display position X-coordinate is calculated by a following equation, for example: SCCH=PLXPOS−PXDSPLL. As shown in FIG. 16 (B), this step S65 allows the screen display position to be adjusted, and the display position of the player object 108 on the display screen 106 is rendered the same position as PXDSPLL, for example. Therefore, in this case, this results in showing the display screen 106 having the left side adjusted in such a manner as to be as large as possible, the left side being the direction in which the player object 108 proceeds in the switched scene.

On the other hand, if "NO" in the step S63, the CPU 40 performs a right edge check in the succeeding step S67, so as to determine whether or not PLXDSP is equal to or larger than PXDSPLR as shown in FIG. 17 (A). If "YES" in this step S67, the CPU 40 calculates the screen display position X-coordinate in the succeeding step S69 according to a following equation: SCCH=PLXPOS−PXDSPLR. This allows correction of the player object 108 position if it is too close to the screen right edge, as shown in FIG. 17 (B).

Upon completion of the process of the step S65 or the step S67, the process advances to the step S79 of FIG. 34. In addition, if "NO" in the step S67, that is, if PLXDSP is within the range of parameters PXDSPLL and PXDSPLR when facing to the left, as shown in FIG. 18, there is no need for the adjustment, and thus the process advances to a succeeding step S79.

On the other hand, if "NO" in the step S61, that is, if the direction in which to proceed faces to the right, and "1" is set to PLMUKI, the process advances to the step S71 in FIG. 34.

In the step S71 in FIG. 34, the CPU 40 performs the right edge check, so as to determine whether or not PLXDSP is larger than PXDSPRR, as shown in FIG. 11 (A). If "YES" in the step S71, the CPU 40 calculates the screen display position X-coordinate in the succeeding step S73. The screen display position X-coordinate is calculated by the following equation: SCCH=PLXPOS−PXDSPRR, for example. This step S73 allows the screen display position to be adjusted as shown in FIG. 11 (B), and the display position of the player object 108 on the display screen 106 is rendered to the same position as PXDSPRR, for example. In this case, this results in showing the display screen 106 having the right side, which is the direction in which the player object 108 proceeds in the switched scene, adjusted in such a manner so as to be as large as possible.

On the other hand, if "NO" in the step S71, the CPU 40 performs the left edge check in the succeeding step S75, so as to determine whether or not PLXDSP is equal to or less than PXDSRL, as shown in FIG. 13 (A). If "YES" in this step S75, the CPU 40 calculates the screen display position X-coordinate according to a following equation in the succeeding step S77, for example: SCCH=PLXPOS−PXDSPRL. This allows correction of the player object 108 position if it is too close to the left edge of the screen, as shown in FIG. 13 (B).

Upon completion of the process of the step S73 or the step S77, the process advances to the succeeding step S79. In addition, if "NO" in the step S75, that is, if the PLXDSP is within the range of the parameters PXDSPRL and PXDSPR when facing to the right as shown in FIG. 14, there is no need for adjustment, and the process advances to the succeeding step S79.

Subsequently it is checked, by processes from the step S79 to a step S85, whether or not the right and left screen positions reach right and left limit values of the course or the scene. First, in the step S79, the CPU 40 performs the left limit value check so as to determine whether or not SCCH is less than LLIMIT. If "YES" in this step S79, the CPU 40 corrects the screen display position X-coordinate within the scroll limit range, in the succeeding step S81. SCCH is adjusted to be equal to LLIMIT, for example. On the other hand, if "NO" in the step S79, the CPU 40 performs the right limit value check in the succeeding step S83, to determine whether or not SCCH is larger than RLIMIT. If "YES" in this step S83, the CPU 40 corrects the screen display position X-coordinate within the scroll limit range, in the succeeding step S85. SCCH is adjusted to be equal to RLIMIT, for example.

Upon completion of the process of the step S81 or the step S85, the process advances to a step S87 in FIG. 35. In addition, if "NO" in the step S83, SCCH is within the scroll limit range, and therefore, there is no need for the correction. Thus, the process directly advances to the step S87 in FIG. 35.

The processes from the step S87 to a step S95 in FIG. 35 are setting processes for an upper-side parameter PYDSPU in a case that the exit 114 is a downward-facing drainpipe, and processes from a step S97 to a step S105 are setting processes for a lower-side parameter PYDSPD in a case that the exit 114 is an upward-facing drainpipe.

In the step S87 in FIG. 35, the CPU 40 determines whether or not the upper-side parameter PYDSPU is set to its limit value PYDSPULMT. That is, in a case that the exit 114 is an upward-facing drainpipe, PYDSPU is not set to PYDSPULMT, and therefore, in this step S87, it is essentially determined whether or not the exit 114 is the downward-facing drainpipe.

If "NO" in this step S87, that is, in a case that the exit 114 is the downward-facing drainpipe, the CPU 40 compares the upper-side parameter to the player display position, so as to determine whether or not PYDSPU is less than PLYDSP, in the succeeding step S89. That is, in a case that the exit 114 is the downward-facing drainpipe, as shown in FIG. 22 (A), etc., PYDSPU is set to a screen upper limit, and this leads to an assumption that PYDSPU is smaller than the player display position PLYDSP. Herein, this assumption is made certain.

If "YES" in the step S89, the CPU 40 determines whether or not the player display position does not exceed the limit value of the upper-side parameter in the succeeding step S91, that is, whether or not PLYDSP is less than PYDSPULMT as shown in FIG. 23 (A). If "YES" in this step S91, the upper-side parameter PYDSPU is set to the same position as the player display position PLYDSP, in the succeeding step S93, as shown in FIG. 23 (B). Thereby, in a case that the player object 108 exists above the upper-side parameter limit value, the screen adjustment is not performed, as shown in FIG. 23 (A).

On the other hand, if "NO" in the step S91, that is, as shown in FIG. 22 (A) or FIG. 24 (A), in a case that PLYDSP is below PYDSPULMT, the CPU 40 sets the upper-side parameter PYDSPU to the same position as its limit value PYDSPULMT, as shown in FIG. 22 (B) or FIG. 24 (B), in the succeeding step S95.

If "YES" in the step S87, that is, in a case that the exit 114 is not a downward-facing drainpipe, the process advances to the step S97. In addition, upon completion of the process of the step S93 or the step S95, or if "NO" in the step S89, the process advances to the succeeding step S97.

In the step S97, the CPU 40 determines whether or not lower-side parameter PYDSPD is set to its limit value PYDSPDLMT. That is, in a case that the exit 114 is an upward-facing drainpipe, PYDSPD is not set to the PYDSPDLMT, and therefore, it is essentially determined, in this step S97, whether or not the exit 114 is an upward-facing drainpipe.

If "NO" in this step S97, that is, if the exit 114 is an upward-facing drainpipe, the CPU 40 compares the lower-side parameter to the player display position in the succeeding step S99, so as to determine whether or not PYDSPD is greater than PLYDSP. That is, in a case that the exit 114 is an upward-facing drainpipe, as shown in FIG. 19 (A), etc., it is assumed that PYDSPD is set to a screen lower limit, and therefore, greater than player display position PLYDSP. Herein, this assumption is made certain.

If "YES" in the step S99, the CPU 40 determines whether or not the player display position does not exceed the limit value of the lower-side parameter, in the succeeding step S101. That is, as shown in FIG. 20 (A), the CPU 40 determines whether or not PLYDSP is greater than PYDSPDLMT. If "YES" in this step S101, the CPU 40 sets the lower-side parameter PYDSPD to the same position as the player display position PLYDSP, as shown in FIG. 20 (B) in the succeeding step S93. Thereby, as shown in FIG. 20 (A), if the player object 108 exits below the lower-side parameter limit value, no screen adjustment is performed.

On the other hand, if "NO" in the step S101, that is, as shown in FIG. 19 (A) or FIG. 21 (A), if PLYDSP is above PYDSPDLMT, the CPU 40 sets the lower-side parameter PYDSPU to the same position as its limit value PYDSPDLMT, as shown in FIG. 19 (B) or FIG. 21 (B) in the succeeding step S105.

If "YES" in the step S97, that is, if the exit 114 is not an upward-facing drainpipe, the process advances to the succeeding step S107 in FIG. 36. In addition, upon completion of the process of the step S103 or the step S105, or in a case of "NO" in the step S99, the process advances to a step S107 in FIG. 36.

Then, by the processes from the step S107 to a step S113 in FIG. 36, when the area switching destination is a drainpipe of upward or downward direction, the screen position adjustment of the upward and downward directions is performed, based on the direction in which the player object 108 proceeds in the switched area. It is noted that if the area switching destination does not have upward and downward directionality, the adjustment for the display area of the direction in which to proceed is not performed, but a corrective adjustment of the upward and downward directions is performed by these processes.

In the step S107, the CPU 40 performs an upper edge check, so as to determine whether or not player display position PLYDSP is less than the upper-side parameter PYDSPU. If "YES" in this step S107, that is, in a case that display position PLYDSP of the player object 108 is above the upper-side parameter PYDSPU, as shown in FIG. 19 (B), the CPU 40 calculates a screen display position Y coordinate in the succeeding step S109. This screen display position Y coordinate is calculated by the following equation:

SCCV=PLXPOS−PYDSPU, for example. This step S109 allows the screen display position to be adjusted to the upper side as shown in FIG. 19 (C), for example, and the display position of the player object 108 on the display screen 106 is set to the same position as PYDSPU (=PYDSPULMT), for example. This results in showing the display screen 106, having the upper side which is the direction in which the player object 108 proceeds in the switched scene, adjusted in such a manner as to be as large as possible.

Herein, there is described the screen position adjustment to the upper side when the area switching destination is an upward-facing drainpipe, and if the area switching destination is not a drainpipe with upward and downward directions, the corrective adjustment is performed by this step S107 and the step S109, which allows correction of the player object 108 position if it is too close to the screen left edge, as shown in FIG. 13 (B).

On the other hand, if "NO" in the step S107, the CPU 40 performs a lower edge check in the succeeding step S111, so as to determine whether or not player display position PLYDSP is greater than lower-side parameter PYDSPD. If "YES" in this step S111, that is, in a case that display position PLYDSP of the player object 108 is below the lower-side parameter PYDSPD, as shown in FIG. 22 (B), for example, the CPU 40 calculates a screen display position Y coordinate in the succeeding step S113. This screen display position Y coordinate is calculated by the following equation, for example: SCCV=PLYPOS−PYDSPD. This step S113 allows the screen display position to be adjusted to the lower side, as shown in FIG. 22 (C), for example, and the displaying position of the player object 108 on the display screen 106 is set to the same position as PYDSPD (=PYDSPDLMT), for example. Therefore, the display screen 106 is shown with the lower side, which is the direction in which the player object 108 proceeds in the switched scene, adjusted in such a manner so as to be as large as possible.

Herein, there is described the screen position adjustment to the lower side if the area switching destination is a downward-facing drainpipe. However, if the area switching destination is not a drainpipe with upward and downward directionality, the corrective adjustment is performed by this step S107 and the step S113, which allows the correction of the player object 108 position if it is too close to the screen's lower edge.

On the other hand, in a case of "NO" in the step S111, that is, if player display position PLYDSP exists within the range of the upper-side parameter PYDSPU and lower-side parameter PYDSPD, as shown in FIG. 20 (B), FIG. 21 (B), FIG. 23 (B), or FIG. 24 (B), etc., the upward and downward screen adjustment is not performed, and the process directly advances to a step S115. Upon completion of the process of the step S109 or the step S113, the process advances to the step S115.

Subsequently, by processes from the step S115 to a step S121, it is checked whether or not the screen position of the upward and downward directions reaches the upward and downward limit values of the course or the scene. First, in the step S115, the CPU 40 performs an upper limit value check, so as to determine whether or not SCCV is less than ULIMIT. If "YES" in this step S115, the CPU 40 corrects the screen display position Y coordinate within the scroll limit range, in the succeeding step S117. SCCV is set to be equal to ULIMIT, for example.

On the other hand, if "NO" in the step S115, the CPU 40 performs the lower limit value check in the succeeding step S119 so as to determine whether or not SCCV is greater than DLIMIT. If "YES" in this step S119, the CPU 40 corrects the screen display position Y coordinate within the scroll limit range, in the succeeding step S121. SCCV is set to be equal to DLIMIT, for example.

Upon completion of the process of the step S117 or the step S121, the process advances to a step S123. In addition, if "NO" in the step S119, SCCV is within the range of the scroll limit, there is no need of the correction. Therefore, the process directly advances to the step S123.

Furthermore, in the step S123, the CPU 40 restores the position (PLXPOS, PLYPOS) of the player object to the initial position. More specifically, initial value data of PLXPOSTMP temporarily stored is set to PLXPOS, and the initial value data of PLYPOSTMP temporarily stored is set to PLYPOS. Thereby, on the switched display screen 106, as shown in FIG. 12 (A), for example, the player object 108 is displayed in the initial position. Upon completion of this step S123, the process returns to the flowchart in FIG. 31.

Returning to FIG. 31, upon completion of the process of the step S21, the process returns to the step S1 and repeats the process, and the game process of the switched scene is executed. Therefore, in the step S15, based on the screen display position, adjusted by the area switching process of the step S21, the display screen 106 of the switched area is displayed on the LCD 16. That is, the screen display position is, as required, adjusted based on the direction in which the player object 108 proceeds in the switched scene, so that the direction in which to proceed is reflected on the display screen 106.

Therefore, according to this embodiment, when the scene is switched, the position of the display screen is adjusted, based on the direction in which the player object 108 is to proceed in the switched scene, so that it is possible to display the display screen 106, on which the direction in which to proceed is reflected. Therefore, the direction in which to proceed is easy to determine, and in addition, it is easier to understand the situation in the direction in which to proceed, and consequently easier for the player to play. In addition, as shown in FIG. 12, for example, the game starts to display from the adjusted display screen 106 after being switched. Thus, it is possible to prevent the awkward scrolling of the display screen, even if no operation is performed after the scene is switched, as in the prior art, so that the player is not confused.

Furthermore, if the display area in the direction in which to proceed is rendered as large as possible, and the display area which is not the direction in which to proceed is rendered as small as possible, it is possible to display a screen distinguishing between the area the player is intended to see and the area the player is not intended to see, depending on the direction in which the player object faces, thus providing a more fluid game play experience.

It is noted that in the above embodiment, the adjusted screen display position (adjusted position) is calculated based on the parameter for the screen adjustment and the display position data of the player object 108. However, in another embodiment, the adjusted screen position coordinates data (adjusted position coordinates data), correlated with each direction in which to proceed of the player objects 108 in the switched scene, may be stored in the ROM 52 in advance, for example. That is, this adjusted position coordinates data is set in advance to a value that results in a display screen that is already adjusted, that is, on which the direction in which to proceed is reflected, so that a calculation after the switch is not needed. Then, when the operation for switching the area is performed, the direction in which to proceed in the switched scene is detected, and the adjusted position coordinates data corresponding to the detected direction may be assigned and set to the screen display position (SCCH, SCCV). According to this embodiment, there is a problem that there will be more settings, which leads to more data, however, it is advantageous to be more flexible. That is, it is possible to determine a free screen position adjusted to the direction in which to proceed by each switched area, thus the game can display the display screen 106 appropriate for the situation by each switched area, for example. This makes it possible to perform a variety of screen displays.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game apparatus provided with a display device, said game apparatus enabling a player to play a game having a plurality of different scenes and displaying a portion of a scene background image in each of said plurality of different scenes, said scene background image having an area larger than a display screen area displayed on said display device, comprising:
   game operation control mechanism operable by the player to produce game operation inputs for controlling game operations;
   player-object programmed logic circuitry configured to generate a player object acting in response to an operation input from said operation control mechanism;
   background image programmed logic circuitry configured to scroll a background image that is visible within the display screen area by changing a position of the display screen area within the larger background image area based on a movement of said player object;
   position determining programmed logic circuitry configured to determine a position of said player object within a displayed scene;
   scene switching programmed logic circuitry configured to switch from a first scene to a second scene when said position determining programmed logic circuitry determines that said player object exists in a predetermined position within a scene;
   advancing direction programmed logic circuitry configured to predetermine, prior to an occurrence of a scene switch, an advancing direction for the player object to advance within said second scene based upon detecting an operation input used for controlling a direction of movement of said player object within said first scene;
   display screen area position detecting programmed logic circuitry configured to determine a position of said display screen area within the background image area;
   player object boundary setting programmed logic circuitry configured to set up predefined boundaries within the display screen area, wherein said boundaries are defined by upper and lower ordinate value limits or left and right abscissa value limits for said player object within the display screen area;
   displaying position adjusting programmed logic circuitry configured to determine an adjusted displaying position of said display screen area within said larger background image area based on a predetermined advancing direction for said player object and a determined position of said player object within said display screen area to be displayed in said second scene such that a position of the player object is maintained within said predefined boundaries within the display screen area; and
   displayed-data programmed logic circuitry configured to generate adjusted image display data for rendering an adjusted game scene image within said display screen area whenever switching from said first scene to said second scene is performed, wherein said adjusted game scene image includes said player object and a portion of said background image corresponding to an adjusted displaying position of said display screen area as determined by said displaying position adjusting programmed logic circuitry, and wherein
   said adjusting of a displaying position of said display screen area within the larger background image area results in the player object being displayed within predefined distance limits from opposing edges of the display screen area.

2. A game apparatus according to claim 1, wherein
said advancing direction predetermining programmed logic circuitry is also configured to determine a proceeding direction of said player object within a scene which is displayed immediately prior to occurrence of a scene switching for use as the proceeding direction of a player object in the switched scene,
and said displaying position adjusting programmed logic circuitry adjusts the displaying position of said display screen area based on a determined proceeding direction which occurred in said scene displayed immediately prior to said scene switching.

3. A game apparatus according to claim 1, wherein
said advancing direction predetermining programmed logic circuitry also determines a direction of an exit in a switched scene for use as the proceeding direction in said switched scene, and
said displaying position adjusting programmed logic circuitry deter mines an adjusted displaying position of said display screen area based on a determined direction of said exit.

4. A game apparatus according to claim 1, wherein
said displaying position adjusting programmed logic circuitry determines an adjusted displaying position of said display screen area in such a manner that a display area on the proceeding direction side in a switched scene is rendered as large as possible.

5. A game apparatus according to claim 1, wherein
said displaying position adjusting programmed logic circuitry computes an adjusted displaying position based on position data of said player object in a switched scene.

6. A game apparatus according to claim 1, further comprising:
an adjusted displaying position data storage area that stores adjusted displaying position data that is correlated with each proceeding direction in a switched scene; and
said displaying position adjusting programmed logic circuitry sets said adjusted displaying position data as a position of said display screen.

7. A game apparatus according to claim 1, wherein
said scene switching programmed logic circuitry switches the scene from a first displayed scene to a second displayed scene when a predetermined scene-switching condition is satisfied, wherein said predetermined scene-switching condition is satisfied when said position determining programmed logic circuitry determines that said player object exists in a predetermined position within a displayed scene and a predetermined operation input is produced by the game operation control mechanism.

8. A storage medium that stores a game program executable by a processor in a game apparatus which is provided with a display device and at least one operating control device, said program enabling a player to play a game having a plurality of different scenes and displaying a portion of a scene background image in each of said plurality of different scenes, said scene background image having an area that is larger than a display screen area displayed on said display device, said game program causing the processor of said game apparatus to perform operations of:

generating and displaying a player object that moves in response to an operation input from said operation control mechanism;

moving a displaying position of said display screen area within said larger background image area such that a background image displayed on said display device scrolls in a particular direction based on a movement direction of said player object;

detecting a position of said player object within a displayed scene;

switching from displaying a first scene to displaying a second scene upon detecting that said player object exists in a predetermined position within the first scene;

determining, prior to an occurrence of a scene switch, an advancing direction for the player object to advance within said second scene based upon an operation input previously used for controlling a direction of movement of said player object within said first scene;

determining a position of said display screen area within the larger background image area;

setting up predefined boundaries within the display screen area, wherein said boundaries are defined by upper and lower ordinate value limits or left and right abscissa value limits for said player object within the display screen area;

adjusting a displaying position of said display screen area within said larger background image area based on said advancing direction such that a position of the player object is maintained within said predefined boundaries within the display screen area; and generating adjusted image display data for rendering an adjusted game scene image within the display screen area, said adjusted game scene image including said player object and a portion of said background image corresponding to an adjusted displaying position of said display screen area, wherein said adjusting of a displaying position of said display screen area within the larger background image area results in the player object being displayed within predefined distance limits from opposing edges of the display screen area.

9. A storage medium that stores a game program according to claim 8, wherein determining an advancing direction further comprises determining a direction in which said player object is proceeding in a scene displayed immediately prior to occurrence of a scene switching and using a determined direction as the proceeding direction for said player object in the switched scene, and wherein the adjusting of a displaying position of said display screen area is based on the determined direction and the player object's position relative to one of said predefined left and right abscissa value limits.

10. A storage medium that stores a game program according to claim 8, wherein determining an advancing direction includes determining a direction of an exit in said switched scene and using the determined direction of the exit as an advancing direction for said player object in a switched scene, and the adjusting of a displaying position of said display screen area in the switched scene is based on the determined direction of said exit.

11. A storage medium that stores a game program according to claim 8, wherein the adjusting of a displaying position of said display screen area is performed such that an amount of display area viewable on an advancing direction side of said player object in a switched scene is made as large as possible while maintaining said player object within said predefined boundaries within the display screen area.

12. A storage medium that stores a game program according to claim 8, wherein the adjusting of a displaying position of said display screen area includes computing an adjusted position based on position data of said player object in a switched scene.

13. A storage medium that stores a game program according to claim 8, wherein said game apparatus further comprises adjusted position data storage that stores adjusted position data correlated with each advancing direction in a switched scene; and wherein the adjusting of a displaying position includes setting the display position of said display screen area.

14. A storage medium that stores a game program according to claim 8, wherein switching from a first displayed scene to a second displayed scene occurs only when said player object exists in a predetermined position within a displayed scene and a predetermined operation is input from said at least one operating control device.

15. A method of displaying a subsequent game scene in a video game apparatus having a stored background scene image that is larger than a screen area which is displayed, comprising:

determining, prior to displaying the subsequent scene, an advancing direction in which a displayed player object is to be displayed as facing in the subsequent game scene to be displayed;

determining a position within the larger background image for a display screen area that is used to provide a scene background for a subsequent game scene;

determining an adjusted position of the display screen area within the larger background image based on a position of the player object within the display screen area and a determined advancing direction of said player object, wherein said adjusted position of said display screen area within the larger background image results in the player object being displayed within predefined distance limits from opposing edges of the display screen area;

switching a displayed game scene to the subsequent game scene if the player object is at a predetermined position in said displayed game scene, wherein the subsequent game scene is displayed using the adjusted position of the display screen area within the background image.

16. The method of claim 15 wherein a determination of said advancing direction is based on a direction in which a player object was proceeding in a game scene displayed just prior to switching to said subsequent game scene.

17. The method of claim 15 wherein a determination of said advancing direction is based on a direction fixed by an exit direction of an object through which the player object passes in a displayed scene which triggers a displaying of the subsequent scene.

18. The method of claim 15 wherein said adjusting includes adjusting the position of the display screen area within the larger background image such that an area of a game scene that is displayed in an advancing direction in which a displayed player object is to proceed in the subsequent game scene is maximized.

* * * * *